US012724698B2

(12) United States Patent
Salehnamadi et al.

(10) Patent No.: US 12,724,698 B2
(45) Date of Patent: Sep. 1, 2026

(54) AUTOMATED ASSISTIVE-TECHNOLOGY DRIVEN ACCESSIBILITY TESTING ENVIRONMENTS

(71) Applicant: The Regents of the University of California, Oakland, CA (US)

(72) Inventors: Navid Salehnamadi, Irvine, CA (US); Sam Ranier Malek, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 280 days.

(21) Appl. No.: 18/287,561

(22) PCT Filed: Apr. 22, 2022

(86) PCT No.: PCT/US2022/025872
§ 371 (c)(1),
(2) Date: Oct. 19, 2023

(87) PCT Pub. No.: WO2022/226259
PCT Pub. Date: Oct. 27, 2022

(65) Prior Publication Data

US 2025/0307119 A1 Oct. 2, 2025

Related U.S. Application Data

(60) Provisional application No. 63/178,708, filed on Apr. 23, 2021.

(51) Int. Cl.
*G06F 11/36* (2025.01)
*G06F 3/0481* (2022.01)
(Continued)

(52) U.S. Cl.
CPC ........ *G06F 11/3684* (2013.01); *G06F 3/0481* (2013.01); *G06F 3/0484* (2013.01);
(Continued)

(58) Field of Classification Search
CPC ............. G06F 11/3684; G06F 11/3688; G06F 11/3692; G06F 11/3664; G06F 11/3612;
(Continued)

(56) References Cited

U.S. PATENT DOCUMENTS 9,600,401 B1 * 3/2017 Haischt ................. G06F 3/0484
9,996,613 B2 * 6/2018 Jadhav .................... G06F 16/95
(Continued)

OTHER PUBLICATIONS

Yasmine N. El-Glaly, Teaching Accessibility to Software Engineering Students, Mar. 11-14, 2020, [Retrieved on Apr. 13, 2026]. Retrieved from the internet: <URL: https://dl.acm.org/doi/pdf/10.1145/3328778.3366914> 8 Pages (121-127) (Year: 2020).*

*Primary Examiner* — Anibal Riveracruz
(74) *Attorney, Agent, or Firm* — Chong IP Law Group

(57) ABSTRACT

Assistive service driven automated accessibility testing environments in accordance with embodiments of the invention are disclosed. In one embodiment, an automated environment for testing an application ("app") using an assistive service is provided, the automated environment being embodied in code executable by a processor of a testing device, which when executed causes the testing device to generate at least one use-case specification for an app under test, execute at least part of the at least one use-case specification on the app using at least one assistive service, and generate an accessibility report for the app.

23 Claims, 15 Drawing Sheets

(51) Int. Cl.

| | |
|---|---|
| ***G06F 9/44*** | (2018.01) |
| ***G06F 11/3668*** | (2025.01) |
| ***G06F 17/30*** | (2006.01) |
| ***G06F 21/57*** | (2013.01) |
| *G06F 3/0484* | (2022.01) |
| *G06F 11/3604* | (2025.01) |

(52) U.S. Cl.
CPC ...... *G06F 11/3612* (2013.01); *G06F 11/3688* (2013.01); *G06F 11/3692* (2013.01)

(58) Field of Classification Search
CPC ........ G06F 3/0481; G06F 3/0484; G06F 8/38; G06F 8/20
See application file for complete search history.

(56) References Cited

U.S. PATENT DOCUMENTS

| | | | | |
|---|---|---|---|---|
| 10,068,095 | B1 * | 9/2018 | Segal | G06F 21/577 |
| 10,762,280 | B2 * | 9/2020 | Bradley | G06F 40/134 |
| 11,526,159 | B2 * | 12/2022 | Mcgregor | G06F 3/04815 |
| 12,072,788 | B2 * | 8/2024 | S | G06F 11/3684 |
| 2005/0175974 | A1 * | 8/2005 | Hansen | G09B 7/00<br>434/362 |
| 2007/0074167 | A1 * | 3/2007 | Cohrs | G06F 11/3672<br>717/124 |
| 2016/0054985 | A1 * | 2/2016 | Cragun | G06F 8/38<br>715/762 |
| 2018/0074945 | A1 * | 3/2018 | Bansal | G06F 11/3692 |
| 2019/0258725 | A1 * | 8/2019 | Parthasarathy | G06F 16/3347 |
| 2022/0164278 | A1 * | 5/2022 | Coffin | G06F 11/3688 |
| 2022/0237483 | A1 * | 7/2022 | Mossler | G06N 5/04 |

* cited by examiner

842 ambivalent

[am-biv-uh-luh nt]

Dictionary Thesaurus Learners Upgrad ambivalent adjective 1. having mixed feelings about someone or something being unable to choose between two (usually opposing) courses of action The whole family was ambivalent about the move to the suburbs.

She is regarded as a morally ambivalent character in the play.

2. Psychology. of or relating to the coexisten within an individual of positive and negati feelings toward the same person, object, or

844

FIG. 8C

AUTOMATED ASSISTIVE-TECHNOLOGY DRIVEN ACCESSIBILITY TESTING ENVIRONMENTS

CROSS-REFERENCE TO RELATED APPLICATION

The current application is a National Stage of International Application No PCT/US22/25872, which claims priority to U.S. Provisional Patent Application No. 63/178,708 filed on Apr. 23, 2021, the disclosures of which are incorporated herein by reference.

FIELD OF THE INVENTION

The present invention generally relates to computer applications and more specifically to automated assistive-technology driven accessibility testing environments.

BACKGROUND

Applications ("apps"), whether mobile apps or web apps, are permeating every aspect of the daily life of billions of people around the world, from personal banking to communication, transportation, and more. The ability to access and use apps with ease is vital for everyone, especially for approximately 15% of the world population with some form of disability. Even the simplest operations, taken for granted by regular users, can be daunting tasks for disabled users. Case in point, in a recent observation of a blind person using his iOS mobile device, researchers at UC Irvine found it took over 50 interactional turns to open a web browser, enter a search term, and navigate to the first result. While the interaction is technically possible, it is hardly usable. Within the accessible computing research community, it is well-documented that automated software accessibility compliance checks fail to evaluate true access at the use case level. As a result, in the case of people who are blind, users resort to rote memorization of navigation sequences, decline to update software applications (apps) they have committed to memory, or stop using apps altogether.

Unfortunately, in the current state of affairs, software inaccessibility is widespread. In the largest empirical study of accessibility issues among mobile apps to date, researchers at UC Irvine found extensive violation of basic accessibility guidelines, e.g., over 99.6% of the top 1,500 Android apps on Google Play market have some form of accessibility issue. Awareness as to the importance of software accessibility is growing due to new 2019 regulatory mandates, which extend the Americans with Disabilities Act to Internet-enabled apps, leading to record numbers of web accessibility-related lawsuits. Software organizations are in dire need of solutions that can help them develop and deliver accessible software.

Part of the blame rests on software developers, who by and large do not have a good understanding of the challenges faced by disabled users. In fact, accessibility as a topic of instruction is rarely covered in US academic institutions preparing students for careers in software development. Software developers' lack of knowledge, however, is exacerbated by the scarcity of effective software development and testing tools. Existing automated solutions for validating the accessibility of software are woefully insufficient. They either fail to detect many real accessibility issues, or report too many superficial issues that are irrelevant in practice.

SUMMARY OF THE INVENTION

The various embodiments of the present use-case and assistive service driven automated accessibility testing environments (may also be referred as "accessibility testing environments" or "automated environments") contain several features, no single one of which is solely responsible for their desirable attributes. Without limiting the scope of the present embodiments, their more prominent features will now be discussed below. In particular, the present systems, methods, and devices for accessibility testing will be discussed in the context of the Android mobile operating system and mobile apps. However, the use of Android is merely exemplary and various other operating systems may be utilized for assistive service driven accessibility testing as appropriate to the requirements of a specific application in accordance with embodiments of the invention. Likewise, the use of mobile apps is merely exemplary and various other types of apps, including desktop apps and web apps, may be utilized as appropriate to the requirements of a specific application in accordance with embodiments of the invention. In addition, the present systems, methods, and devices for accessibility testing will be discussed in the context of particular assistive services, i.e., SwitchAccess (an Android service for navigating app for users with motor impairment) and/or TalkBack (a screen reader for Android users with blindness or visual impairment). However, the use of Switch Acess and/or TalkBack are merely exemplary and various other assistive services, such as Apple's Siri, Amazon's Alexa, and Google Assistant (voice user interfaces for users with various types of disabilities) may be utilized for accessibility testing as appropriate to the requirements of a specific application in accordance with embodiments of the invention. After considering this discussion, and particularly after reading the section entitled "Detailed Description," one will understand how the features of the present embodiments provide the advantages described here.

One aspect of the present embodiments includes the realization that for the world population with disabilities, accessibility is a critical software quality attribute. The ever-growing reliance of users with disability on mobile apps further underscores the need for accessible software. Existing automated accessibility assessment techniques primarily aim to detect violations of predefined guidelines, and thereby produce a massive amount of accessibility warnings that often overlook the way software is actually used by users with disability. The present embodiments provide a high-fidelity form of accessibility testing for apps (may be referred to as "Latte"), that may automatically reuse tests written to evaluate an app's functional correctness to assess its accessibility as well. In one embodiment, Latte first extracts the use case corresponding to each test, and then executes each use case in the way disabled users would, i.e., using assistive services such as, but not limited to, SwitchAccess and/or TalkBack. Another type of assistive service is voice user interface such as, but not limited to, Apple's Siri, Amazon's Alexa, and Google Assistant, which can be used by both users with and without disabilities. In another embodiment, the invention finds accessibility issues in an app by automatically crawling (exploring) the app. In yet another embodiment, the invention finds accessibility issues in use cases manually performed by a user, who could be among others a developer of the app. As described further below, empirical evaluation on real-world Android apps demonstrates Latte's effectiveness in detecting substantially more useful defects than prior techniques.

Another aspect of the present embodiments includes the realization that accessibility issues may be prevalent in mobile apps, hindering their use by users with disability. To date, various automated accessibility analysis techniques have been proposed to deal with the widespread prevalence of accessibility issues. Common across many of these tools is the way they aim to identify accessibility issues in terms of predefined rules derived from accessibility guidelines. For instance, whether a label for an icon is missing, whether there is sufficient contrast between text and background, whether the actionable elements are too close to each other, etc. While it is important for developers to follow these guidelines in the construction of their apps, the rules by themselves are not able to precisely determine the difficulties a user with disability may experience. For example, from a disabled user's standpoint, there is a significant difference between accessibility issues affecting the main functionalities of an app versus those affecting its incidental functionalities (e.g., advertisement banners, copyright disclaimers), yet the existing techniques provide no effective means of distinguishing between the two. It has been noted that developers tend to either not utilize or simply ignore the results of existing accessibility analysis tools, because they produce a massive amount of accessibility warnings, many of which are minor, or simply wrong. Further, many of the problems that people with disabilities encounter may not be covered by standard accessibility guidelines (e.g., Web Content Accessibility Guidelines).

Another aspect of the present embodiments includes the realization that none of the existing automated accessibility analysis techniques consider assistive services such as, but not limited to, a screen reader tool (e.g., TalkBack) or a navigation tool (e.g., SwitchAccess) in their analysis. Since disabled users are typically reliant on assistive services in interacting with apps, many important cues are missed when assistive services are not considered in the evaluation of an app's accessibility. For instance, a screen with a dynamic user interface (UI) may have no apparent accessibility issue in the implementation of its individual elements, yet be completely unusable by a disabled user due to the assistive technology's inability to detect the changes in UI. As another example, a screen with a revolving list of items in one panel may have no accessibility issue in its implementation according to existing guidelines, yet prevent a disabled user from reaching another panel on that screen using the commonly available assistive technologies. Yet as another example, users with blindness, motor impairment, or missing limbs can use voice user interfaces to interact with apps, e.g., "type something on searchbar"; however, these interfaces may demonstrate unexpected behaviors such as typing in an edit text box that is different from the intended text box.

In a first aspect, an automated environment for testing an application ("app") using an assistive service is provided, the automated environment being embodied in code executable by a processor of a testing device, which when executed causes the testing device to: generate at least one use-case specification for an app under test; execute at least part of the at least one use-case specification on the app using at least one assistive service; and generate an accessibility report for the app.

In an embodiment of the first aspect, the at least one assistive service is a screen reader for users with visual impairment.

In another embodiment of the first aspect, the at least one assistive service is a navigation tool for users with motor impairment.

In another embodiment of the first aspect, the at least one assistive service is a voice user interface for users with visual, physical, or motor impairment.

In another embodiment of the first aspect, the at least one assistive service is an alerting tool for users with hearing impairment.

In another embodiment of the first aspect, the at least one use-case specification is comprised of a human-perceivable step to execute a functionality in the app.

In another embodiment of the first aspect, the automated environment is embodied in further code that, when executed by the processor, further causes the testing device to generate the at least one use-case specification by analyzing at least one Graphical User Interface (GUI) test.

In another embodiment of the first aspect, the automated environment is embodied in further code that, when executed by the processor, further causes the testing device to analyze the GUI test by determining at least one GUI element and at least one action performed on the at least one GUI element.

In another embodiment of the first aspect, the automated environment is embodied in further code that, when executed by the processor, further causes the testing device to generate the at least one use-case specification by observing for a manually performed human-perceivable step on the app.

In another embodiment of the first aspect, the automated environment is embodied in further code that, when executed by the processor, further causes the testing device to generate the at least one use-case specification by automatically crawling the app.

In another embodiment of the first aspect, the automated environment is embodied in further code that, when executed by the processor, further causes the testing device to execute the at least one use-case specification by generating accessibility events.

In another embodiment of the first aspect, the automated environment is embodied in further code that, when executed by the processor, further causes the testing device to execute the at least one use-case specification by analyzing the accessibility events and initiating at least one action using the assistive service.

In another embodiment of the first aspect, the automated environment is embodied in further code that, when executed by the processor, further causes the testing device to execute the at least one use-case specification by executing the at least one action on the app.

In another embodiment of the first aspect, the automated environment is embodied in further code that, when executed by the processor, further causes the testing device to execute the at least one use-case specification by receiving result data from the app based on executing the at least one action.

In another embodiment of the first aspect, the automated environment is embodied in further code that, when executed by the processor, further causes the testing device to generate the accessibility report using the result data from the app.

In another embodiment of the first aspect, the automated environment is embodied in further code that, when executed by the processor, further causes the testing device to execute the at least one use-case specification using at least one termination condition.

In another embodiment of the first aspect, the at least one termination condition is configurable.

In another embodiment of the first aspect, the automated environment is embodied in further code that, when executed by the processor, further causes the testing device to execute the at least one use-case specification on the app via an emulator.

In another embodiment of the first aspect, the accessibility report comprises accessibility failures encountered by the app during execution of the at least one use-case specification using the accessibility service.

In another embodiment of the first aspect, the accessibility report comprises recorded screens of the app during execution of the at least one use-case specification using the accessibility service.

In another embodiment of the first aspect, the accessibility report comprises execution details that include metadata generated during execution of the at least one use-case specification using the accessibility service.

In another embodiment of the first aspect, the accessibility report comprises accessibility warnings encounter by the app during execution of the at least one use-case specification using the accessibility service.

In another embodiment of the first aspect, the automated environment is executed after an app update as part of a continuous integration development process.

In another embodiment of the first aspect, the automated environment is executed as part of a regression testing process to determine if the accessibility of a new version of the app is improving or degrading.

BRIEF DESCRIPTION OF THE DRAWINGS

The various embodiments of the present automated assistive-technology driven accessibility testing environments now will be discussed in detail with an emphasis on highlighting the advantageous features. These embodiments depict the novel and non-obvious accessibility testing environments shown in the accompanying drawings, which are for illustrative purposes only. These drawings include the following figures:

FIGS. 8A-C are screenshots of apps with accessibility warnings in accordance with an embodiment of the invention.

DETAILED DESCRIPTION OF THE DRAWINGS

Figure 1:
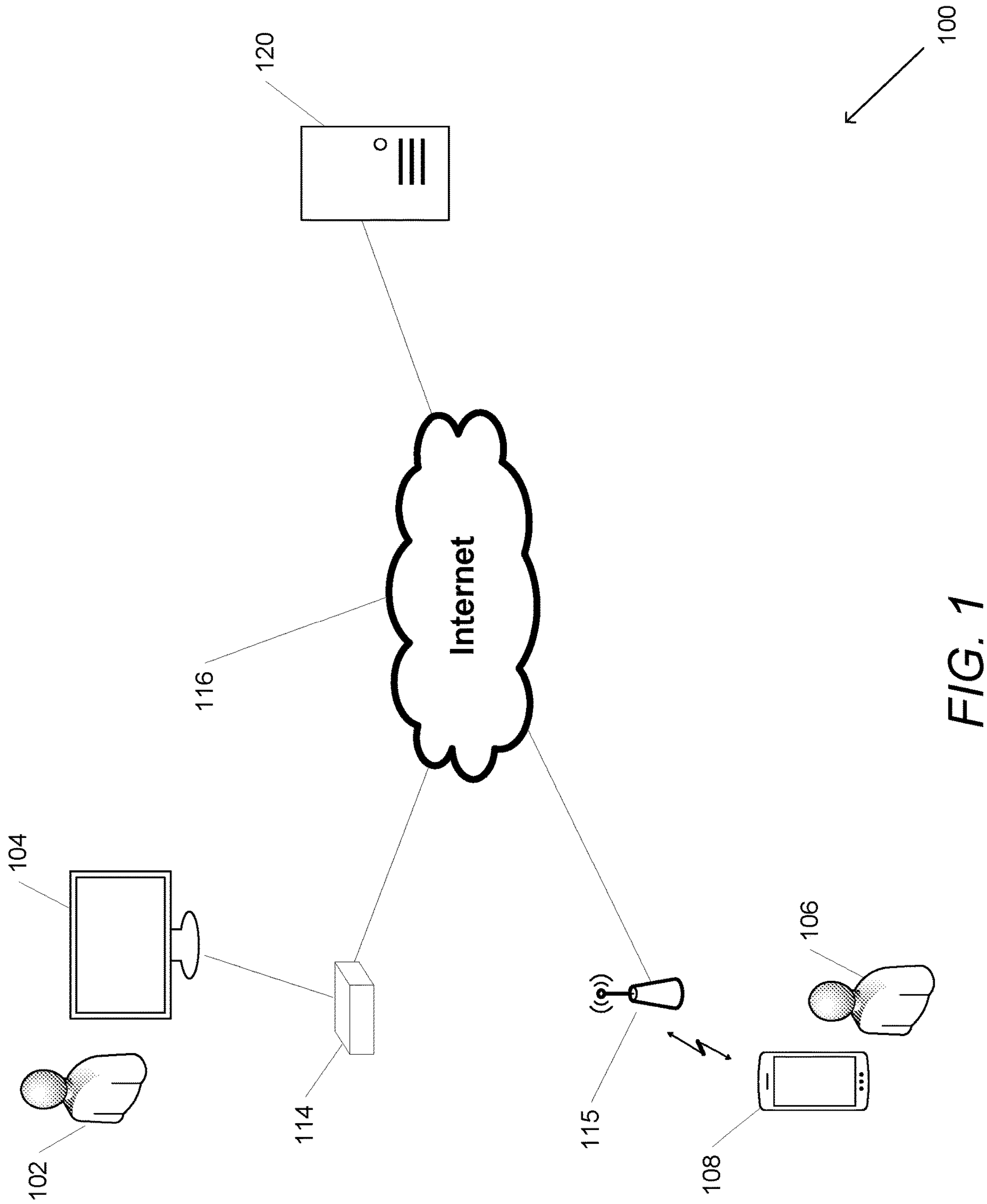
FIG. 1 is a block diagram illustrating a system for accessibility testing in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

The embodiments of the present accessibility testing environments are described below with reference to the figures. These figures, and their written descriptions, may indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

Turning now to the drawings, automated assistive-technology driven accessibility testing environments (may also be referred to as "Latte") in accordance with embodiments of the invention are described. As described above, insights that guide the present embodiments include (1) the focus of automated accessibility analysis should be on the main functionalities of an app, and not some incidental features, such as displayed ads, and (2) a high-fidelity form of analysis should reflect the way disabled users actually interact with apps, i.e., using the assistive technologies. In some embodiments, the present invention may provide for an automated accessibility analysis that may build on the way developers already validate apps for functional correctness. For example, a widely adopted practice in software development is for developers to write system tests, often in the form of Graphical User Interface (GUI) tests, to validate the important use cases (functionalities) of an app for correctness. These use cases may include functionalities of an app that should also be accessible. In many embodiments, given an app under test and a set of GUI tests (written by developers) as input, Latte may extract Use-Case Specification(s) corresponding to each test. In some embodiments, Latte may generate Use-Case Specification(s) by observing a user manually using the app under test, as further described below. In some embodiments, Latte may generate Use-Case Specification(s) by crawling the app under test, as further described below.

In various embodiments, a Use-Case Specification may define the human-perceivable steps a test takes to exercise a particular functionality in an app. As further described below, Latte may execute the Use-Case Specification using an assistive service (e.g., TalkBack and/or SwitchAccess). If a use case cannot be completed using an assistive service, it may indicate that the corresponding use case has an accessibility problem, which should be reported to the developer. Latte mitigates the limitations of existing automated accessibility analysis techniques by evaluating the accessibility issues in a more realistic setting by using one or more assistive services. In more than half of the subject apps tested, Latte detected accessibility issues that were not detected by Google's Accessibility Scanner, the most widely used accessibility analyzer for Android. Moreover, unlike prior solutions that produce a massive number of accessibility warnings by simply scanning an app's screens irrespective of its purpose, Latte produces a relatively small number of actionable accessibility defects that affect a disabled user's proper usage of the app's main functionalities. In several embodiments, Latte may produce a detailed report for each failed use case that provides the developer with the cause of inaccessibility and steps to replicate it.

Although the most reliable method of validating an app's accessibility is through user evaluation, finding users with different types of disability and conducting such evaluations may be prohibitively difficult, especially for small development teams with limited resources. Latte may provide developers useful insights into how their apps behave when engaged through an assistive service, allowing them to fix the issues prior to their release. Latte may also complement user evaluation by allowing the development teams to hone in on a subset of problematic use cases that are flagged by Latte. In particular, Latte provides a high-fidelity form of automated accessibility analysis that evaluates the degree to which important use cases of an app can be accessed by users with disability through assistive services. Systems for accessibility testing environments using assistive-technology in accordance with embodiments of the invention are further described below.

Accessibility Testing Environment Systems

A block diagram illustrating a system for accessibility testing in accordance with an embodiment of the invention is shown FIG. 1. An accessibility environment system 100 may include a tester 102 on an accessibility testing device 104 and a user 106 on a client device 108. In many embodiments, the testing device 104 may be utilized to provide automated assistive-technology driven accessibility testing environments for testing apps to be used on the client device 108 by the user 106, as further described below. In various embodiments, the system 100 may include any number of users each having their own client device. In several embodiments, the accessibility testing device 104 and/or the client device 108 may include various electronic devices, such as, but not limited to, a desktop computer, laptop computer, tablet computer, smart phone, etc. In some embodiments, the accessibility testing device 104 may be a server automated to perform accessibility testing with or without a tester 102. In some embodiments, the accessibility testing device 114 may be running an emulated client device 108, which may be executing an app under test. In some embodiments, the accessibility testing device 114 may be an emulated device itself.

In reference to FIG. 1, the accessibility testing device 104 and the client device 108 may be connected to and have access to the Internet 116 in a manner known to one of ordinary skill in the art. For example, the accessibility testing device 104 may access the Internet 116 using a variety of methods such as, but not limited to, a modem and/or router 114 (and/or using a wireless access point). Further, the client device 108 may access the Internet 116 via a wireless access point 112, such as, but not limited to, Wi-Fi (and/or using a modem and/or router). In some embodiments, the accessibility testing device 104 and/or the client device 108 may access the Internet 116 using a cellular network. The system 100 may also include an app server 120 in communication with the accessibility testing device 104 and/or the client device 108. In many embodiments, the accessibility testing device 104 may be configured to receive one or more app(s) for testing and one or more assistive service(s) to be used in testing the app under review. In some embodiments, the assistive service(s) may be pre-loaded on the testing device. In some embodiments, the accessibility testing device 104 may utilize an emulator to create a "native" environment to perform assistive-technology driven accessibility testing on the app under review.

Figure 2:
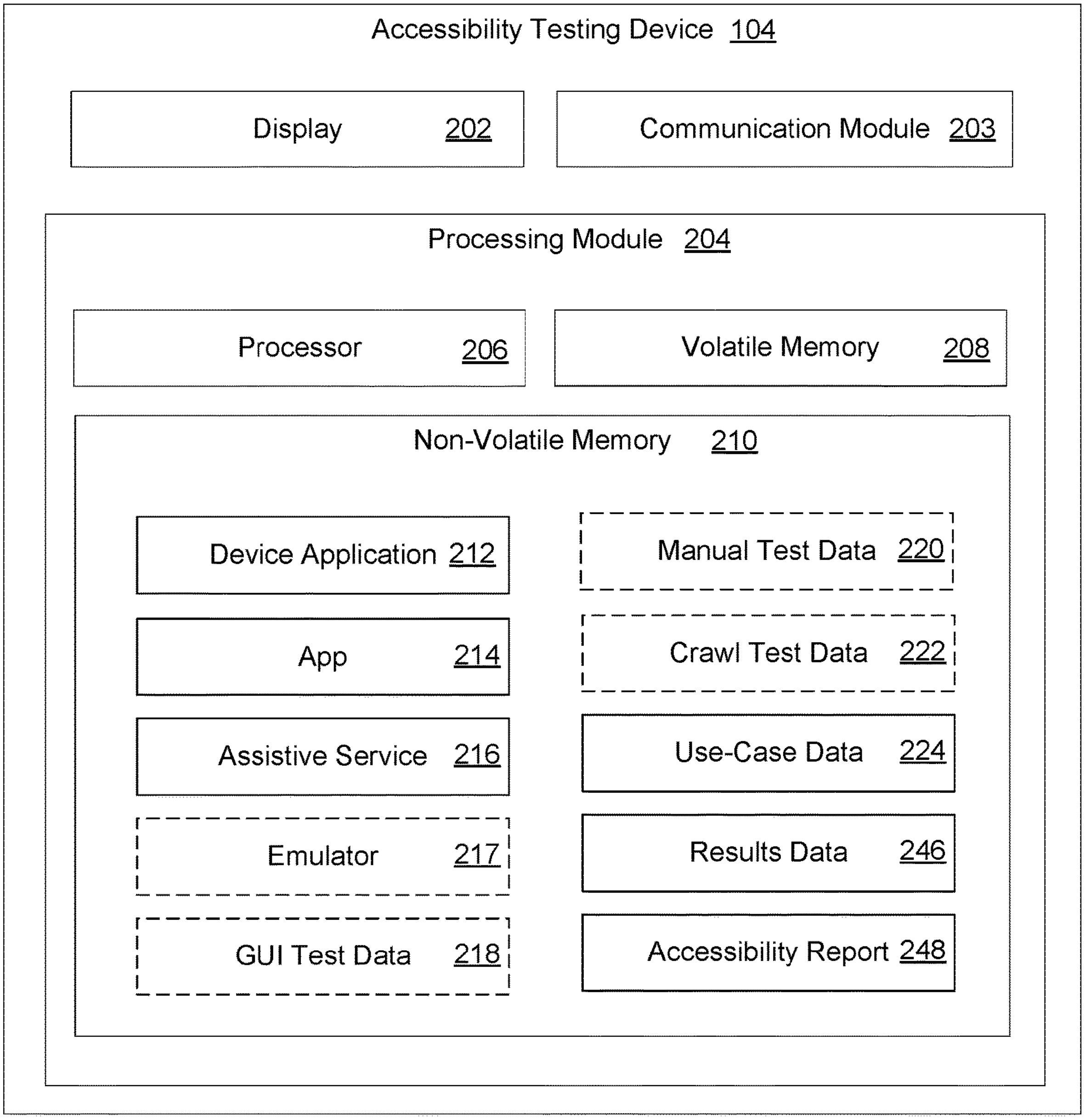
FIG. 2 is a block diagram illustrating an accessibility testing device in accordance with an embodiment of the invention.

A block diagram illustrating an accessibility testing device in accordance with an embodiment of the invention is shown in FIG. 2. In many embodiments, an accessibility testing device 104 may be configured to provide for automated assistive-technology driven accessibility testing of apps, as further described below. In many embodiments, the accessibility testing device 104 may include a processing module 204 that is operatively connected to a display 202 and a communication module 203. The processing module 204 may comprise a processor 206, volatile memory 208, and non-volatile memory 210. The non-volatile memory 210 may include a device application 212 that configures the processor 206 to perform various functions for accessibility testing using assistive-technology, as further described below.

In reference to FIG. 2, the accessibility testing device 104 may receive one or more apps 214 using the communication module 203, as further described below. In some embodiments, the accessibility testing device 104 may receive assistive service(s) 216 using the communication module 203, as further described below. In some embodiments, the accessibility testing device 104 may also include an emulator 217 that allows the accessibility testing device 104 to emulate a native operating system environment for testing of the app 214 using the assistive service 216, as further described below. In some embodiments, the apps 214 and/or the assistive service 216 may be pre-loaded on the accessibility testing device 104 or emulator 217. In many embodiments, the accessibility testing device 104 may store the apps 214, assistive service 216, and/or emulator 217, in the non-volatile memory 210.

In further reference to FIG. 2, the accessibility testing device 104 may be configured to generate use-case data 224 (may also be referred to as "use-case specifications") using GUI test data 218 (may also be referred to as "GUI test"), manual test data 220, and/or crawl test data 222, as further described below. In various embodiments, the accessibility testing device 104 may be configured to execute use-case specifications on the app 214 using the assistive service 216, collect and analyze results data 246 from the app 214, and generate one or more accessibility report(s) 248, as further described below. In some embodiments, the accessibility testing device 104 may receive the GUI tests 218 from an app developer using the communication module 203. In some embodiments, the GUI test data 218, manual test data 220, crawl test data 222, use-case data 224, results data 246, and/or accessibility report 248, may be stored in the non-volatile memory 210. A person of ordinary skill in the art would understand that the data stored in non-volatile memory 210 may be stored in volatile memory 208 as well. In various embodiments, the accessibility testing device 104 may be configured to transmit the accessibility report 248 to an app developer and/or any other entity with interest in the functioning of the app 214 being tested. In some embodiments, the accessibility test device 104 may be in network communication with one or more server(s) (e.g., an accessibility server, app server, assistive service server) in performing any of the processes for assistive-technology driven accessibility testing, as described herein.

In the illustrated embodiments of FIG. 2, the various components including (but not limited to) the processing modules 204 and the communication module 203 are represented by separate boxes. The graphical representations depicted in FIG. 2 are, however, merely examples, and are not intended to indicate that any of the various components of the accessibility testing device 104 are necessarily physically separate from one another, although in some embodiments they might be. In other embodiments, however, the structure and/or functionality of any or all of the components of the accessibility testing device 104 may be combined. In addition, in some embodiments the communication module 203 may include its own processor, volatile memory, and/or non-volatile memory. In addition, the communication module 203 may comprise (but is not limited to) one or more transceivers and/or wireless antennas (not shown) configured to transmit and receive wireless signals such as (but not limited to) satellite, radio frequency (RF), Bluetooth or WIFI. In other embodiments, the communication module 203 may comprise (but are not limited to) one or more transceivers configured to transmit and receive wired signals.

Although specific systems for accessibility testing using assistive services are discussed above with respect to FIGS. 1-2, any of a variety of systems including a variety of accessibility testing devices, client devices, servers, communicating using various communication protocols as appropriate to the requirements of a specific application can be utilized in accordance with embodiments of the invention. Processes using assistive services for accessibility testing of apps in accordance with embodiments of the invention are discussed further below.

Accessibility Testing Processes

Figure 3:
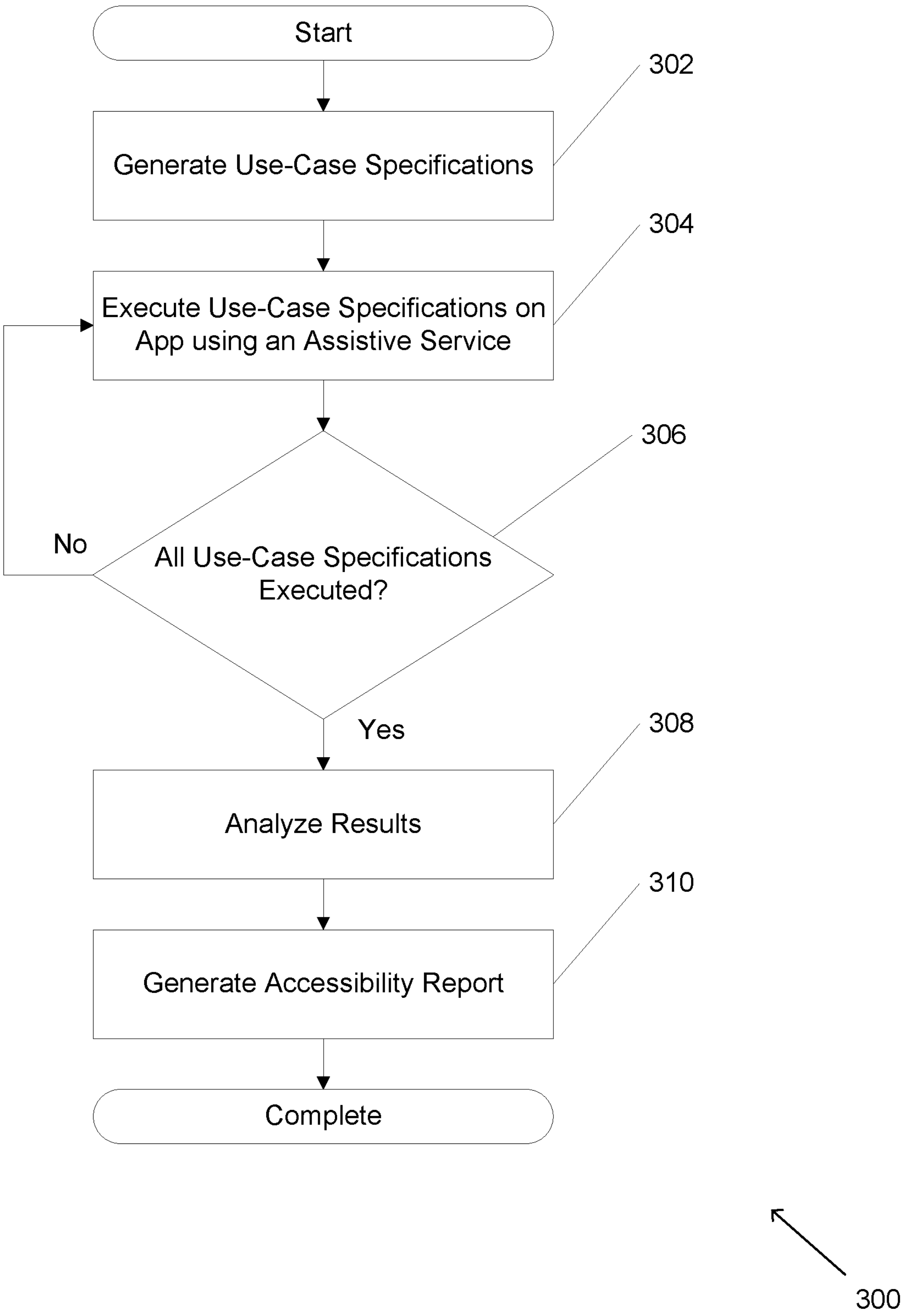
FIG. 3 is a flow chart illustrating a process for accessibility testing in accordance with an embodiment of the invention.

A flow chart illustrating a process for accessibility testing in accordance with an embodiment of the invention is shown in FIG. 3. The process 300 may include generating (302) use-case specification(s), as further described below. The process 300 may also include executing (304) the use-case specifications on the app to be tested using at least one assistive service, as described herein. As further described below, there may be scenarios during the use-case execution (304) where the navigation process may not finish and the process 300 may include configurable termination conditions to prevent getting stuck in such cases. In some embodiments, once a termination conditions is satisfied, the process 300 may mark the step as inaccessible, as further described below. In some embodiments, when an inaccessible step is encountered, the process 300 may execute it using the corresponding instruction in the original test script allowing the process 300 to continue the analysis and report all accessibility issues within a use case, as further described below. In further reference to process 300, if all of the use-case specifications are not executed (306), the process 300 may continue to execute use-case specifications. However, if all the use-case specifications are executed (306), then the process 300 may include collecting and analyzing (308) the results, as further described below. In some embodiments, the process 300 may collect and analyze (308) results after each use-case specification before all use-case specifications are executed (306). In addition, the process 300 may also include generating (310) one or more accessibility reports, as further described below.

Figure 4:
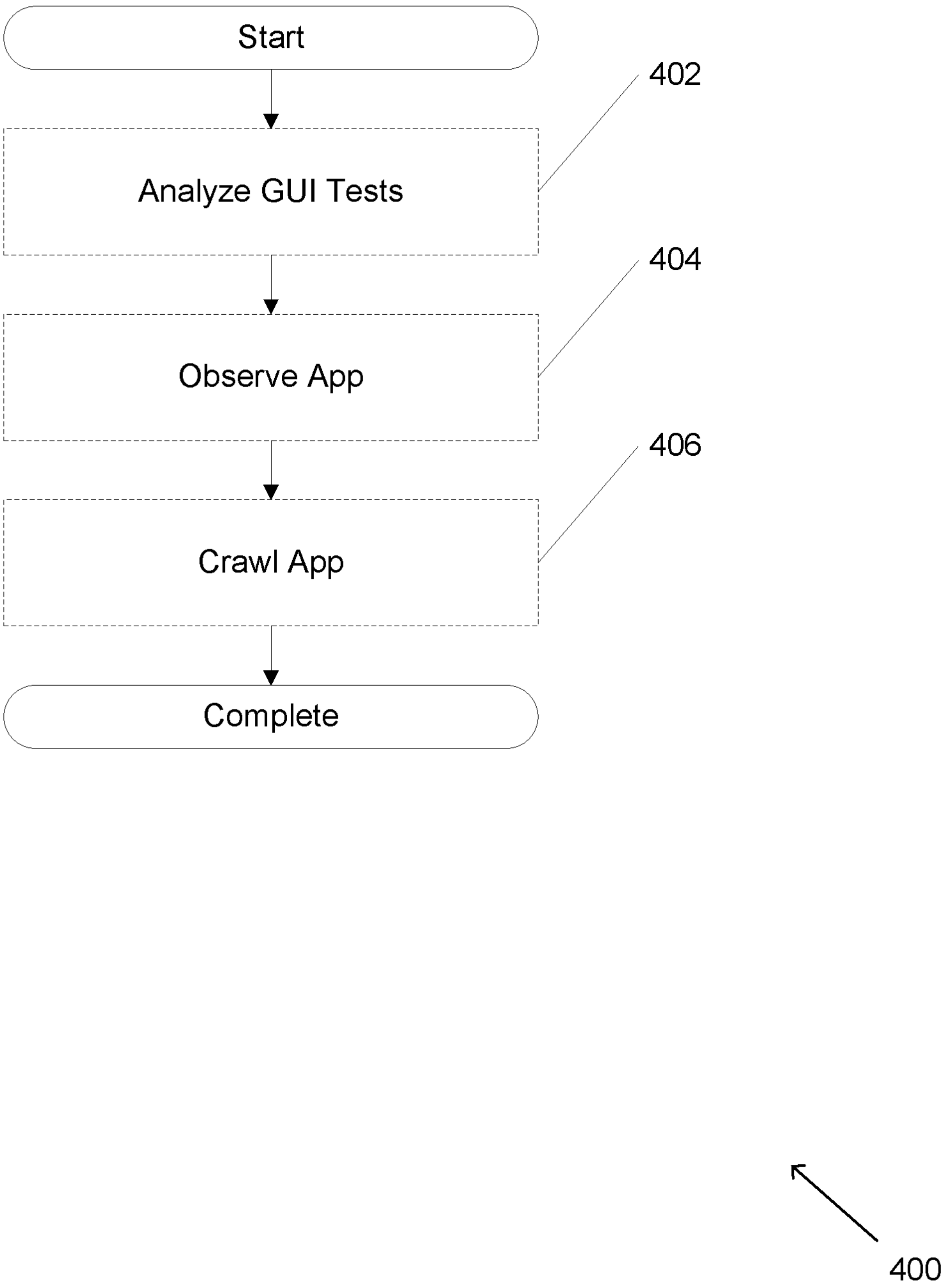
FIG. 4 is a flow chart illustrating a process for generating use-case specifications in accordance with an embodiment of the invention.

A flow chart illustrating a process for generating (302) use-case specifications in accordance with an embodiment of the invention is shown in FIG. 4. The process 400 may include generating use-case specifications by analyzing (402) GUI tests, as further described below. In some embodiments, the process 400 may include generating use-case specifications by observing (404) the app. For example, a tester 102 may manually use the app with tasks and observe (404) to generate use-case specifications. In some embodiments, the process 400 may include generating use-case specifications by crawling (406) the app. For example, an app crawler may be utilized to automatically and systematically explore the different screens/activities of the app under test to generate use-case specifications. Any combination of the above-mentioned techniques (402, 404, and 406) may be utilized together or separately to generate the use-case specifications (302).

Although specific processes for accessibility testing using assistive-technology are discussed above with respect to FIGS. 3-4, any of a variety of processes and variations of the described processes as appropriate to the requirements of a specific application can be utilized in accordance with embodiments of the invention. An illustrative example in accordance with embodiments of the invention are further described below.

Illustrative Example

Figure 5A:
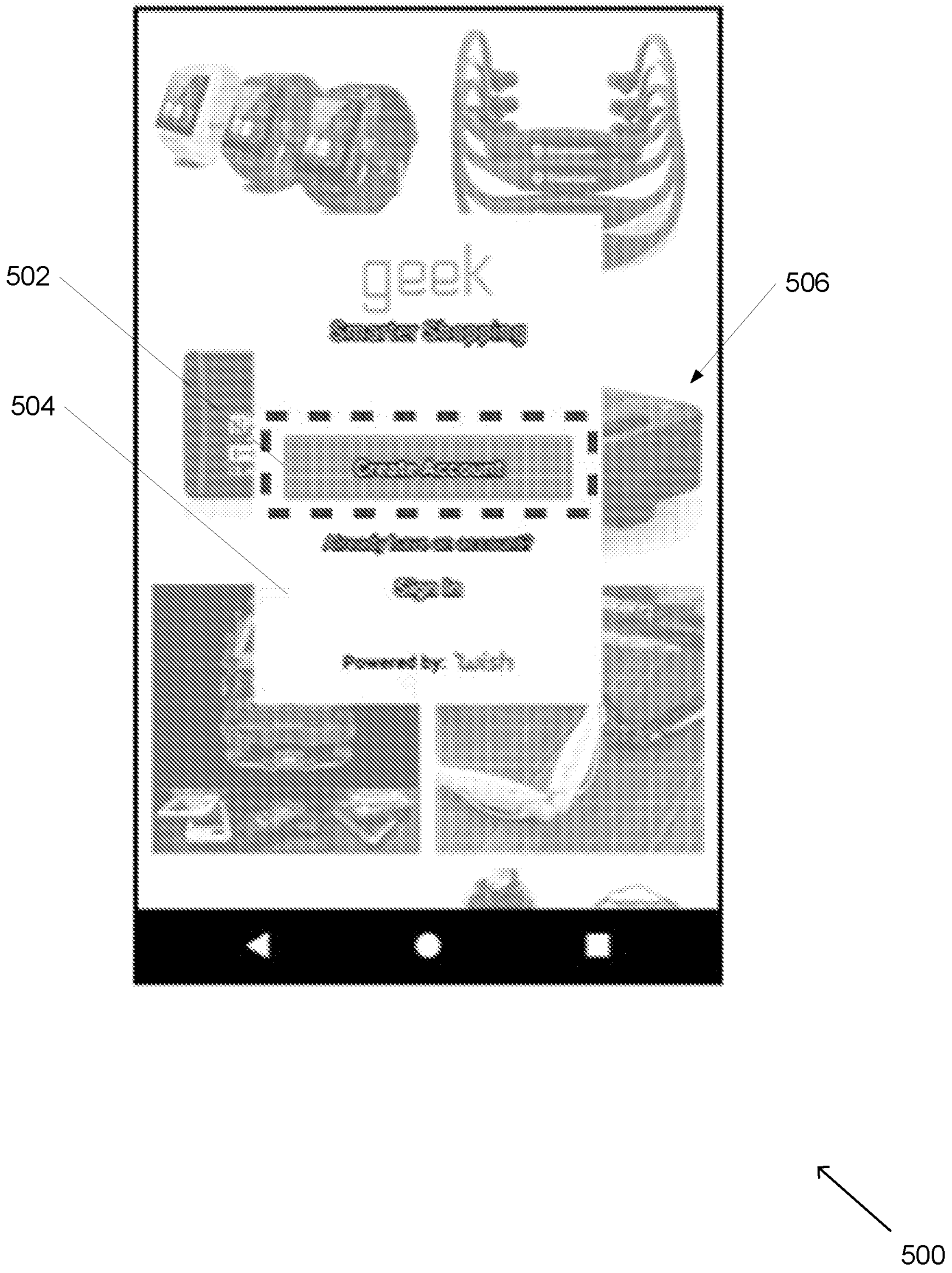
FIG. 5A is a screenshot of a launch screen of an app with accessibility issues.

A screenshot 500 of a launch screen of an app in accordance with an embodiment of the invention is shown in FIG. 5A. FIG. 5A shows a launch screen of a popular app the Geek—Smarter Shopping app (version '2.3.7'). The foreground layout contains register and login buttons 502, 504, while the background 506 includes a layout of rolling decorative images. An important use case in this app is the registration, since it is the prerequisite for accessing all other functionalities. This use case starts by clicking on the Create Account button 502 (the dashed box in FIG. 5A) followed by filling a form with user information (not depicted in the figure). A developer may create a GUI test to automatically verify this use case is working. For example, Listing 1 (depicted below) shows a GUI test in Appium testing framework written in Python. In many embodiments, the GUI test may be a sequence of steps performing actions on specific elements on the screen, e.g., clicking on an element with resource-id com.contextlogic.geek:id-/login_fragment_create_account_button.

While a user without disability interacting with the app can see the full screen and perform all gestures, a user with disability may have to rely on assistive services to complete their intended task. For example, a blind user may rely on a read back service such as, but not limited to, TalkBack to read the textual description of the elements on the screen. TalkBack may give spoken feedback and notifications to users by announcing headers, labels, icons and other assistive content defined by developers.

Listing 1: The test script corresponding to the registration use case

```
1 find_element_by_id("com.contextlogic.geek:id/
    login_fragment_create_account_button").click( )
2 find_element_by_xpath("/android.widget.FrameLayout/.../android.
    widget.EditText[1]").send_keys("John Doe")
3 find_element_by_id("fragment_email_text").send_keys("john.
    doe@example.com")
4 find_element_by_id("fragment_password_text").send_keys("StR0nGp@ss"
    )
5 find_element_by_xpath("/android.widget.FrameLayout/.../android.
    widget.TextView[3]").click( )
```

The user may explore the app either by reading the elements in order or touching different parts of the screen, asking TalkBack to announce the textual description of the selected element. A user with motor disability, on the other hand may utilize an assistive service such as, but not limited to, SwitchAccess to navigate the app; however, the user may be able to see the whole screen. For example, SwitchAccess is an assistive service that enables users to interact with the device using a special keyboard with a limited set of buttons such as Next and Select. SwitchAccess highlights the focused element on the screen. The user may use the two buttons to change the focus to next element or select the currently focused element.

Figure 5B:
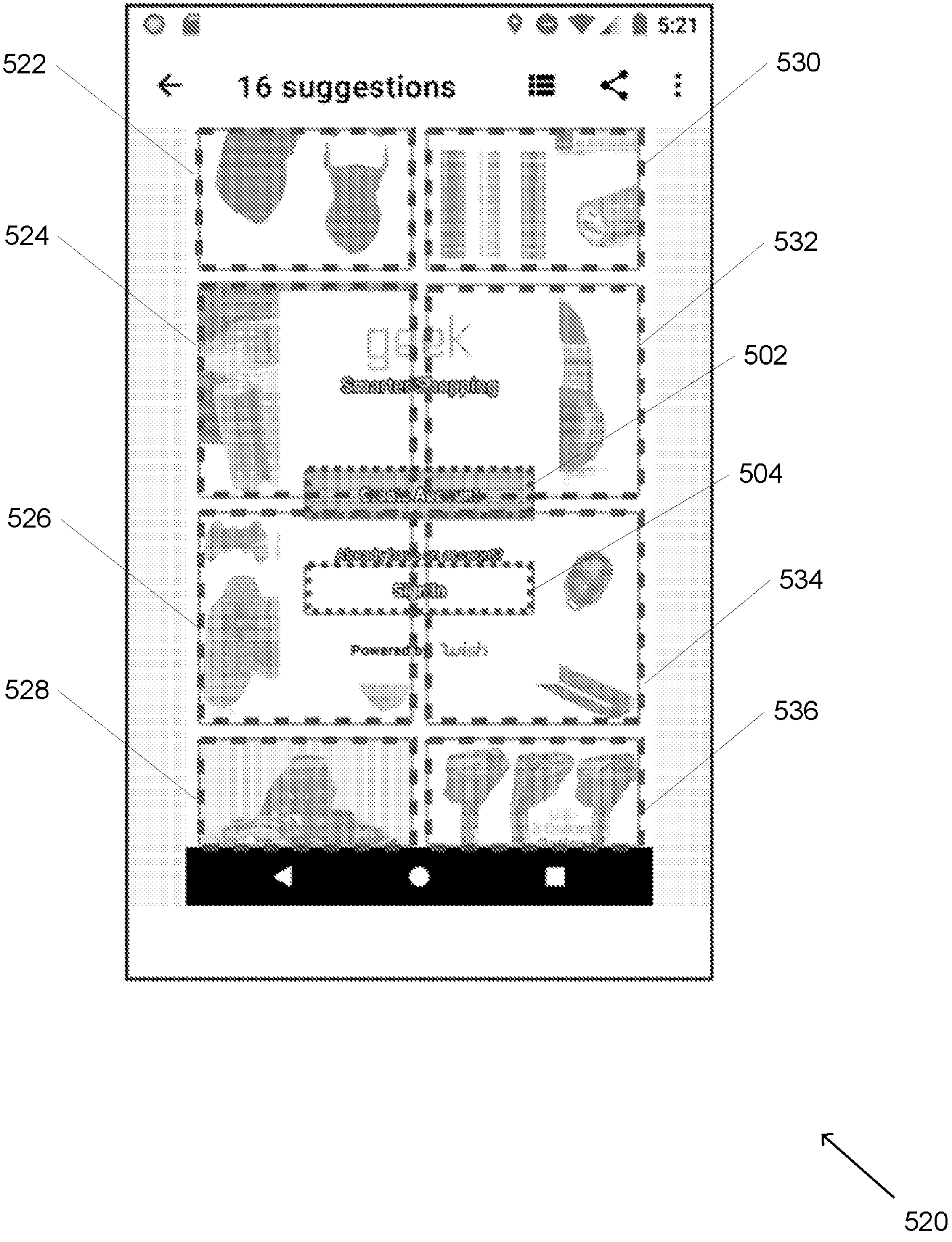
FIG. 5B is a screenshot of a launch screen of an app running an accessibility scanner in accordance with an embodiment of the prior art.

While the developer of an app like this is likely to write a test to evaluate the functional correctness of registration, given its importance to the overall functionality of the app, the conventional execution of such test does not reveal anything about the app's accessibility issues. To test the accessibility of this app, a conscientious developer may also run additional accessibility analysis tools such as, but not limited to, the Google Accessibility Scanner a de facto standard tool for analysis of accessibility in Android-on the launch screen and review the identified issues. A screenshot 520 of a launch screen running an accessibility scanner in accordance with an embodiment of the prior art is shown in FIG. 5B. As illustrated, in total, 16 accessibility issues are detected by the Scanner, denoted by solid borders placed around the elements with a problem. Out of these, there are 8 "missing speakable text" and 6 "low image contrast" issues for the decorative images 522, 524, 526, 528, 530, 532, 534, 536 in the background, and 2 "small touch target size" issues for the buttons 502, 504 in the foreground. As can be seen in FIG. 5B, there are many issues with the very first screen, and no particular hint as to the severity of these issues is provided to help the developer prioritize the effort involved in fixing the reported issues. For example, the only accessibility issue reported for Create Account button 502 is the "small touch target size," which in fact does not affect users who rely on assistive tools for their interactions. Once the reported issues are fixed, this screen becomes supposedly accessibility-issue free, according to the automated accessibility scanner.

Figure 5C:
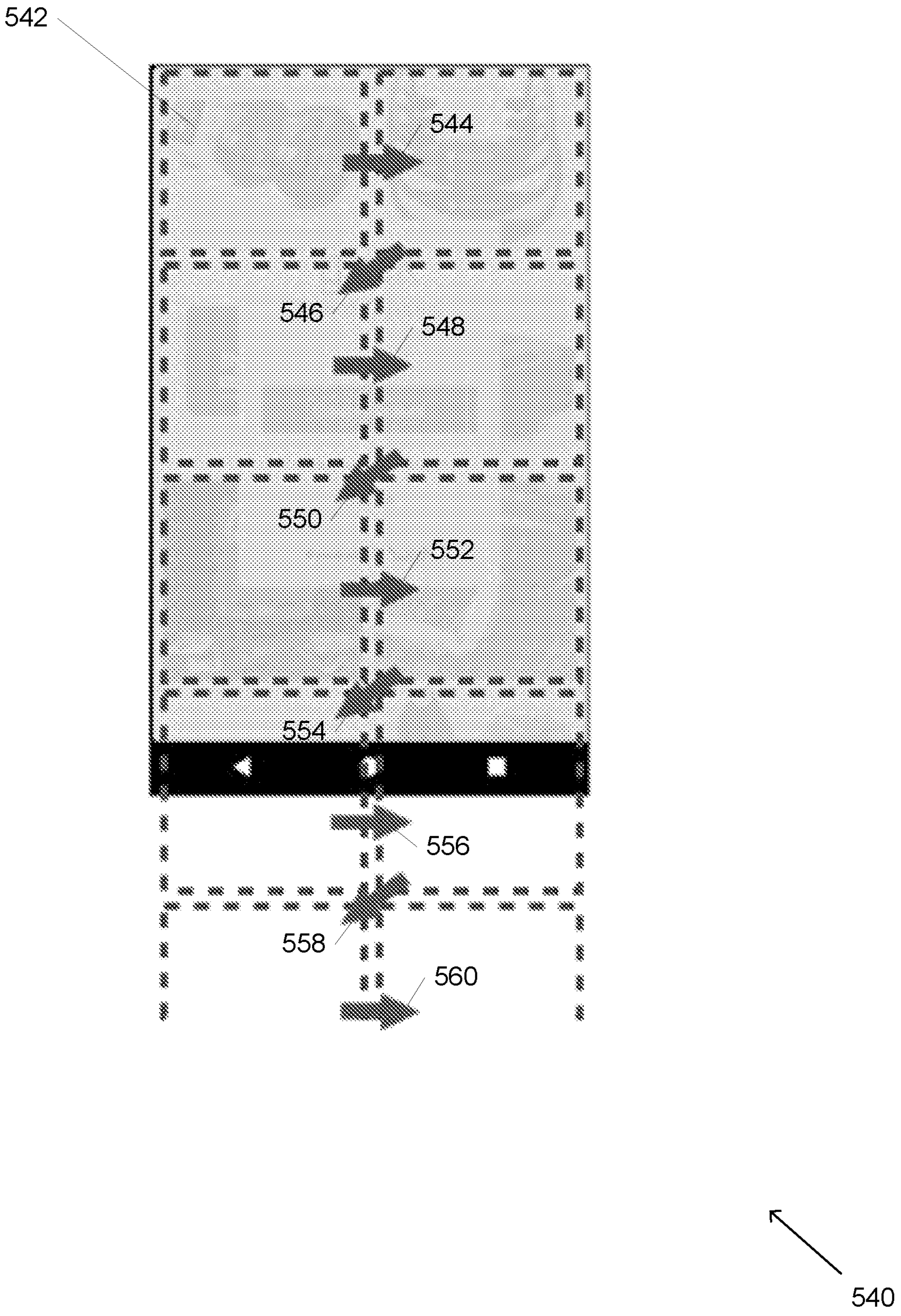
FIG. 5C is a screenshot of a launch screen illustrating a navigation path of an assistive tool in accordance with an embodiment of the invention.

In practice, however, when assistive services such as, but not limited to, TalkBack and SwitchAccess are used to operate this app, the first decorative image in the background receives the focus (top left dotted box 542 in FIG. 5C). A screenshot 540 of a launch screen illustrating a navigation path of an assistive tool in accordance with an embodiment of the invention is shown in FIG. 5C. To reach the Create Account button 502, users have to navigate through the elements. But here, the decorative background layout refills dynamically, i.e., it is a revolving list. As a result, the focus never reaches to the foreground layout. The navigation path taken through the use of assistive tools is depicted as arrows 544, 546, 548, 550, 552, 554, 556, 558, 560 in FIG. 5C. This makes it difficult, if not impossible, for both TalkBack and SwitchAccess users to reach the Create Account button 502. In some cases, it may be possible for the user to touch random spots on the screen and find the button by chance; nevertheless, it would be far from perfect and frustrating at the very least. Although an illustrative example of an Android app and assistive services are discussed above with respect to FIGS. 5A-C, any variety of apps developed for and running on various operating systems and a variety of assistive services, including assistive services created for specific user disabilities and assistive services for various apps and/or operating systems as appropriate to the requirements of a specific application can be utilized in accordance with embodiments of the invention. Accessibility testing environments utilizing assistive-technology in accordance with embodiments of the invention are discussed further below.

Accessibility Testing Environments

Figure 6:
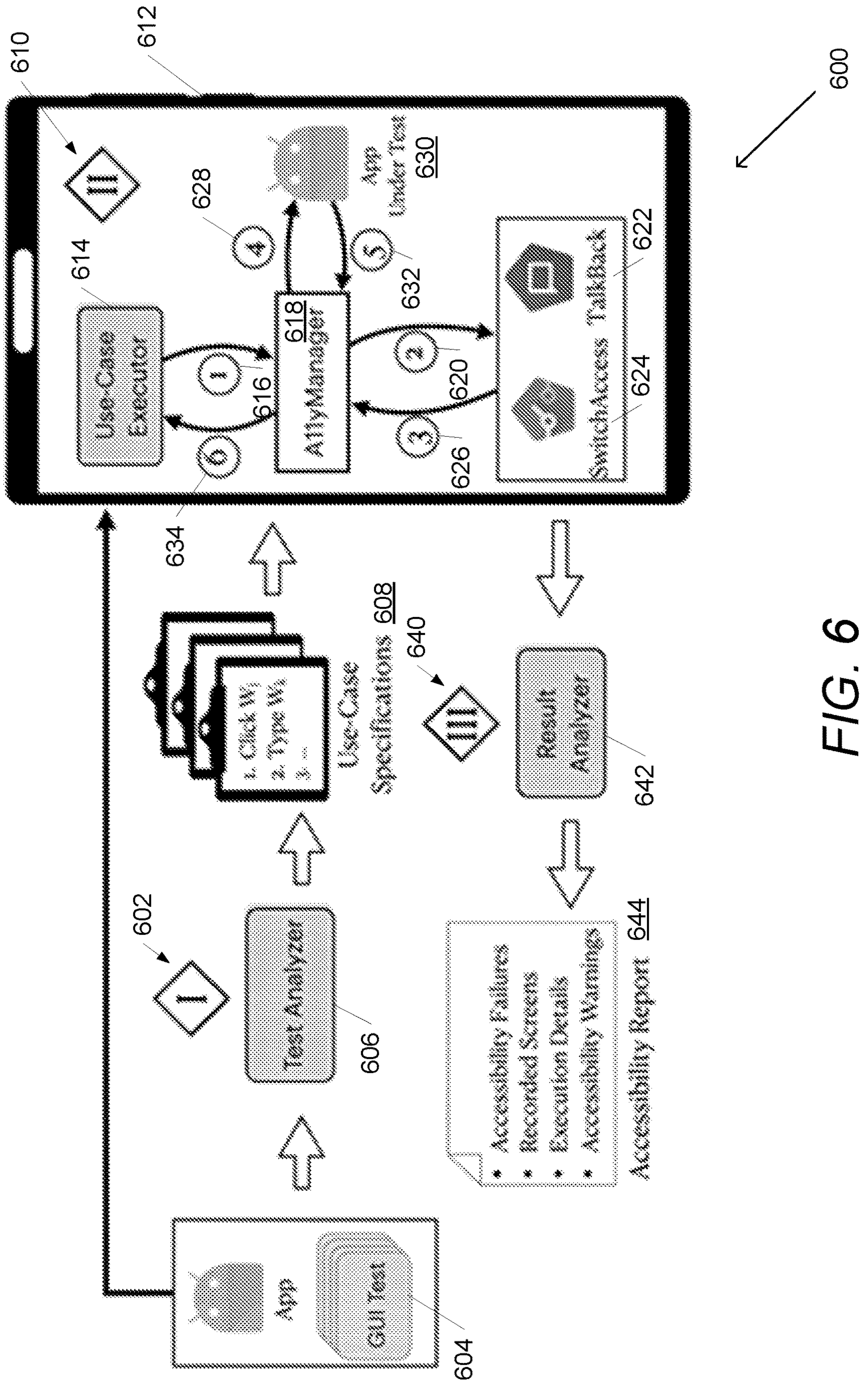
FIG. 6 is a diagram illustrating an accessibility testing environment in accordance with an embodiment of the invention.

One objective of the present embodiments includes development of an automated accessibility analyzer that is use-case and assistive service driven. A diagram illustrating an accessibility testing environment 600 in accordance with an embodiment of the invention is illustrated in FIG. 6. FIG. 6 shows an overview of an accessibility testing environment 600 (may also be referred to as "Latte"). In many embodiments, Latte may include three phases: (I) 602 analysis of the provided GUI test suite of an app (e.g., an Android app) to determine the corresponding use cases, (II) 610 execution of each use case on the app using an assistive service to evaluate the accessibility of the use case, (III) 640 collection and analysis of the results to produce an accessibility report, as further described below. In some embodiments, phase one 602 above may include and/or be replaced by a user manually using an app, in the process determining and exercising its use cases, as described above. In some embodiments, phase one 602 above may include and/or be replaced by analysis of the app by crawling the app to determine the corresponding use cases, as described above.

Test Analyzer

A use case may be a sequence of interactions between a user and a software system for achieving an objective. In the case of a shopping app, for instance, creating an account, searching for a product, and purchasing a product, may be examples of use case. As a common development practice, developers write GUI tests to automatically evaluate the correctness of a software system's use cases. A GUI test may be a sequence of steps, where in each step, the test (1) locates a GUI element, and (2) performs an action on that element. For example, the first step (line 1) in Listing 1 (provided above) locates an element with resource-id equal to com.contextlogic.geek:id/login_fragment_create_account_button and then clicks on it. In many embodiments, GUI tests may uniquely identify elements on the screen. They leverage the implementation details of an app, such as resource-id, to interact with the GUI elements of the app. A GUI test thus follows a white-box approach, i.e., uses the implementation details of an app to drive the execution. Although this format is quite effective for machine execution, it may differ vastly from how users interact with an app. A user may exercise the same use case as a test, but follows a black-box approach, i.e., interacts directly with the UI elements of an app to drive the execution.

Since an objective is to evaluate the accessibility of use cases exercised by tests, the present embodiments may first have to extract a description of the use case in terms of constructs available to a user. For instance, while the test script is able to access a button through its programmatic identifier (i.e., resource-id attribute), a blind user would access it through its textual content description. The Test Analyzer component 606 may take a GUI test 604 as input and transform it into a Use-Case Specification 608, comprising a set of equivalent steps as those performed by the test at the level of abstraction understood by users. In other words, Use-Case Specification 608 of a test may represent the steps a user would perform to exercise the same functionality as that of the test.

Listing 2: The AccessibilityNodeInfo object corresponding to "Create Account" button

```
// Resource Id
viewIdResName: com.contextlogic.geek:id/
   login_fragment_create_account_button;
// Textual information
className: android.widget.TextView;
text: Create Account;
contentDescription: null;
// Other fields
boundsInParent: Rect (0, 0 - 498, 110) ;
boundsInScreen: Rect (291, 856 - 789, 966) ;
clickable: true;
focusable: true;
focused: false;
selected: false;
longClickable: false;
enabled: true;
importantForAccessibility: true;
. . .
```

Finally, the information obtained through the above-mentioned analysis of the GUI tests to arrive at the equivalent Use-Case Specifications 608 may be combined. For example, Listing 3 is the Use-Case Specification generated from the GUI test shown in Listing 1. The first step shows the user clicking on a TextView element with the text "Create Account" and the last step is clicking on an ImageButton element with content description equal to "Submit." Intuitively, a white-box description of a use case (i.e., GUI test) may be transformed to a black-box description of that use case (i.e., Use-Case Specification). In many embodiments, the Test Analyzer component 606 may be written in any programming language (e.g., Python) on top of a testing framework (e.g., the Appium testing framework). A person of ordinary skill in the art would understand that the process of generating Use-Case Specification is similar for other embodiments such as manually interacting with the device or automatically crawling the app.

Use-Case Executor

Listing 3: The use case corresponding to the registration test case in the illustrative example

```
1   Click on element with Text: "Create Account", ContentDescription:
      null, Class: TextView
2   Type "John Doe" on element with Text: "Name", |ContentDescription:
      null, Class: EditText
3   Type "john.doe@example.com" on element with Text: "Email",
      ContentDescription: null, Class: EditText
4   Type "StR0nGp@ss" on element with Text: "Password",
      ContentDescription: null, Class: EditText
5   Click on element with Text: null, ContentDescription: "Submit,
      Class: ImageButton
```

To extract the use cases from GUI tests 604, a dynamic program analysis technique may be utilized that, given a test script and an app, determines (1) the various GUI elements involved in the test and their attributes, and (2) the actions performed on those elements. Dynamic program analysis may entail evaluating a program by executing it. In fact, software testing is the most common form of dynamic program analysis. By dynamically analyzing a test script (i.e., running the test on the app), the AccessibilityNodeInfo object corresponding to each GUI element may be identified. AccessibilityNodeInfo class may be provided by the Android framework and represents the attributes of a GUI element on the screen. For example, the AccessibilityNodeInfo of the element in the first step in Listing 1 (provided above) "Create Account" button, can be found in Listing (provided above). The first field is viewIdResName (or resource-id) that is the identifier of the element. The textual attributes are className, text, and contentDescription. There are also other types of attributes such as coordinates and supported behaviors, e.g., this element is clickable, focusable, etc. The textual attributes (text, contentDescription, and className) for each element may be extracted, since these are the attributes perceived by users in locating GUI elements. Note that the className attribute is perceivable by users, since a sighted or blind user can recognize it visually or textually, i.e., EditText element has its distinguishable shape, and TalkBack announces it as Edit Text Box. Actions (e.g., click, type) may be further extracted that may be performed on the GUI elements from the test script itself. From Listing 1, it may be determined that the use case includes five steps, where the first and last steps click on GUI elements and the other steps enter textual information in GUI elements.

Typically, the existing testing frameworks can access GUI elements and perform actions on them, even if the target element is not visible to the user. For example, the first step of the test shown in Listing 1 is able to locate the "Create Account" button and click on it, no matter where the button is located on the screen. However, users with disability may not be able to perform such actions smoothly. Blind users would need to explore the app using a screen reader to locate the element. Although recognizing elements is comparatively easier for users with motor disability, they may have difficulty reaching and initiating action on the element, as in the illustrative example discussed above.

To improve the fidelity of evaluating accessibility issues for users with disability, Latte may be configured to automatically execute a use case using assistive services. To that end, Latte may provide implementation of AccessibilityService—an abstract service provided by the Android framework to assist users with disabilities. The official assistive tools in Android, such as TalkBack and SwitchAcces, may also be implementations of this abstract service. AccessibilityService may be seen as a wrapper around a mobile device (e.g., a client device) that performs actions on and receives feedback from the device. Since these abilities may introduce security and privacy issues, an implementation of this service should specify the types of feedback it can receive and actions it can perform. For example, TalkBack may receive feedback about all elements on the screen, since it has android:canRetrieveWindowContent attribute in its specification. Moreover, it can perform actions, such as click, on elements; however, it cannot perform gesture such as swiping on the screen, since the attribute android:canPerformGestures does not exist in TalkBack's specification.

In many embodiments, the feedback may be delivered to accessibility services through AccessibilityEvent objects. An implementation of this service should define the method onAccessibilityEvent that is called back by AccessibilityManager—a system-level service that serves as an event dispatcher for AccessibilityEvents. Accessibility events may be generated when something notable happens on the user interface, e.g., an Activity starts, the focus of an element changes, etc. When a change occurs, AccessibilityManager may pass the associated AccessibilityEvent object to onAccessibilityEvent method to interpret and provide feedback to the user. For example, in TalkBack, when an element is focused, its textual description may be announced to the user. Alternatively, in SwitchAccess, the focused element may be highlighted. An AccessibilityEvent object may be associated with an AccessibilityNode Info object that contains the element's attributes. For instance, when a user clicks on "Create Account" button (highlighted in FIG. 5A) the system may create an AccessibilityEvent of type TYPE_VIEW_CLICKED, which is associated with the AccessibilityNodeInfo object shown in Listing 2. Although implementations of AccessibilityService, such as TalkBack and SwitchAccess, are typically used for assisting users to interact with the mobile device, these services may also be configured to cooperate with one another, as described herein. Latte's own implementation of AccessibilityService, called Use-Case Executor, may take a Use-Case Specification as input, and sequentially execute the steps defined in it using TalkBack and SwitchAccess. Alternatively, it can combine a few steps and execute them as one voice command through Google Assistant, Amazon's Alexa, or Apple's Siri (voice user interfaces). For example, a Use-Case Specification such as "Click on Chrome, Click on SearchBar, Type 'apple', Click on Search button" can be combined into a voice command such as "Search 'apple'". Each step in the Use-Case Specification may result in the execution of 6 steps 616, 620, 626, 628, 632, 634 in the accessibility testing device 612, as shown in phase II 610 of FIG. 6.

How the approach may work using TalkBack in accordance with embodiments of the invention is provided below (a similar process may be followed in the case of SwitchAccess or other assistive services):

(1) Use-Case Executor 614 may perform (616) an action using APIs provided by AccessibilityService. For example, Listing 4 shows a code snippet from the implementation of Use-Case Executor 614 that performs (616) a swipe right gesture on the screen. The performed action is received by the AccessibilityManager service (may be referred to as "AllyManager" 618) and generates accessibility events corresponding to the action, e.g., TYPE_GESTURE_DETECTION_START and TYPE_GESTURE_DETECTION_END events for the swipe.

(2) Implementations (620) of AccessibilityService, including TalkBack 622, may receive the generated accessibility events. TalkBack 622 may suppress delivering the incoming events to the app, and possibly translates them to something else. For example, while swiping right on the screen may result in a menu option to be shown, TalkBack 622 may translate that gesture to changing the focus to the next element when TalkBack 622 is enabled on the accessibility testing device.

(3) TalkBack 622 may analyze the incoming event and initiate (626) another action accordingly. For example, in the case of swipe right, TalkBack 622 may change the focus to the next element, and in the case of a double tap, the currently focused element may be clicked. Note that TalkBack 622 is not aware of the sender of these events, in this case Use-Case Executor 614. As a result, TalkBack 622 behaves the same as it would if a human user had performed the action.

(4) AllyManager 618 may receive the new action from TalkBack 622 and send (628) it to the app under test 630. For example, if the TalkBack's 622 action is clicking on the focused element, AllyManager 618 sends (628) an event to the onClickListener class associated with the focused element in the app 630. The app 630 receives the action and updates its internal state accordingly, e.g., executing onClick method of the clicked element.

(5) The app 630 may inform (632) AllyManager 618 regarding the changes in the GUI elements. For example, when "Create Account" button is clicked, the current screen may disappear and another screen with a form may appear.

(6) AllyManager 618 may receive the changes in the layout and dispatch (634) feedback events accordingly, e.g., a TYPE_VIEW_FOCUSED accessibility event associated with the focused element's AccessibilityNodeInfo object. As a result, Use-Case Executor 614 may be informed of the latest changes on the device 612. For instance, it becomes aware of the element that is currently focused. Note that there is a possibility that because of the changes caused by step 5 (632), i.e., showing a new screen, another interaction may be initiated between AllyManager 618 and TalkBack 622, similar to steps 2 (620) and 3 (626) above.

Listing 4: A code snippet from Use-Case Executor that performs a swipe right on the screen using AccessibilityService API (x_left, x_right, and y_middle are the left and right horizontal, and middle vertical coordinates on the screen)

```
Path swipePath = new Path( );
swipePath.moveTo (x_left, y_middle);
swipePath.lineTo (x_right, y_middle);
gestureBuilder.addStroke (new GestureDescription.StrokeDescription(
    swipePath, 0, gestureDuration));
GestureDescription gestureDescription = gestureBuilder.build( );
accessibilityService.dispatchGesture (gestureDescription, callback,
    null);
```

In various embodiments, Use-Case Executor 614 may execute the steps in the use case according to the procedure described above. Each step may include two parts, locating (focusing) the target element, and performing the target action on it. For the first part, Latte may scan the screen by sending swipe right events for TalkBack 622 and Next button events for SwitchAccess 624, until the element that matches the description in the step is focused. Once the element is located (focused), Latte may perform the target action, e.g., if the action is click, Latte may send a double tap event for TalkBack 622 and Select button event for SwitchAccess 624.

There may be two scenarios during the use-case execution where the scanning process may not finish; in other words, none of the focused elements match the description of the target element in the use-case step. First, the textual description of the element may not be sufficient to uniquely recognize the element, because either there are multiple elements with the same description (duplicate labels issue) or the target element does not have any textual description (unlabeled element issue). This scenario typically occurs in the case of TalkBack 622. The other scenario occurs when the target element could not be focused (or reached) by TalkBack 622 or SwitchAccess 624, e.g., illustrative example, as described above, in which "Create Account" button could not be reached.

Latte defines two termination conditions to prevent getting stuck in such cases: (1) if an element is visited more than a predefined number of times, or (2) if a step takes more than a predefined number of interactions to complete. These thresholds are configurable. Once either one of these conditions is satisfied, Latte may mark the step as inaccessible. However, since it may be desirable to identify all accessibility issues in a use case, and not just the first encountered issue, when an inaccessible step is encountered, Latte may execute it using the corresponding instruction in the original test script. This allows Latte to continue the analysis and report all accessibility issues within a use case. In some embodiments of the invention, other termination conditions may be used.

In many embodiments, the Use-Case Executor component 614 may be implemented in various programing languages such as, but not limited to, Java by extending Android's AccessibilityService. As described herein, and for illustrative purposes, the latest versions of TalkBack (8.2) and SwitchAccess (8.2), which were released by Google on Github in July 2020 were utilized.

Result Analyzer

To retrieve the information generated during use case execution automatically, a Command Line Interface (CLI) may be implemented on top of the Android Debug Bridge (ADB). Using the CLI, the Result Analyzer component 642 may communicate with the Use-Case Executor 614 to receive and record details of the execution for each step of a use case as illustrated in FIG. 6. Moreover, in some embodiments, it may automatically record the screen during the use-case execution and store the video clip. Once all use cases are executed, the Result Analyzer 642 aggregates the results and generates an Accessibility Report 644, that may include the following four components. In some embodiments, other types of information may be reported to help developers understand the accessibility of an app under test.

Accessibility Failures. For each use case, Latte may report if it encountered an accessibility failure during its execution using assistive services. A use case may have an accessibility failure if the GUI element of one of its steps cannot be located (focused).

Recorded Screens. While Latte executes a use case, it may record the screens to help developers (1) localize the accessibility issues, and (2) obtain insights into how users with disability may interact with their apps using assistive services.

Execution Details. Latte may report other information extracted from the execution of each use case, including the execution time and the number of interactions to complete the use case. This information can be used as a source of insight for developers.

Accessibility Warnings. If a specific use case takes an exorbitant number of interactions to complete, it may indicate a usability concern for disabled users. This category of issues may be reported as accessibility warnings, since in practice they can adversely affect users with disability. The threshold of what constitutes an exorbitant number of interactions is configurable in Latte. In some embodiments, the exorbitant number of interactions may be predetermined. For the purpose of experiments reported below, it was empirically observed that on average 1 direct interaction with an app requires approximately 5 times more interactions using TalkBack. Thus, the threshold was set to 15 times the number of direct interactions, or 3 times the average number of TalkBack interactions.

Although specific automated assistive-technology driven accessibility testing environments are discussed above with respect to FIG. 6, any of a variety of accessibility testing environments using assistive-technology as appropriate to the requirements of a specific application can be utilized in accordance with embodiments of the invention. Evaluations of accessibility testing environments using assistive-technology in accordance with embodiments of the invention are discussed further below.

EVALUATIONS

Latte was evaluated on real-world apps to investigate the following research questions:

RQ1. How accurately does Latte execute use cases using assistive services?

RQ2. How does Latte compare to Google Accessibility Scanner (the official tool for detecting accessibility issues in Android)?

RQ3. How do the detected accessibility failures and warnings impact the usage of apps?

Experimental Setup

Latte was evaluated using 20 apps, 5 of which have known accessibility issues, as confirmed through user studies with disabled users. The rest have been randomly selected from 13 different categories on Google Play (e.g., entertainment, productivity, finance), where 12 of them have more than 1 million installs.

TABLE 1

The summary of detected accessibility failures.

| | None (Test Cases) | SwitchAccess (Use Cases) | TalkBack (Use Cases) |
|---|---|---|---|
| iPlayRadio | ✓✓ | **YY** | **YY** |
| Feedly | ✓✓ | **YY** | **YY** |
| Checkout51 | ✓✓ | ✓✓ | **Y**✓ |
| Yelp. | ✓✓ | ✓✓ | **YY** |
| Astro | ✓✓ | ✓✓ | x✓ |
| BillManager | ✓✓ | ✓✓ | x✓ |
| Budget | ✓✓✓ | **YY**✓ | **YYY** |
| CalorieCounter | ✓✓✓ | **Y**✓✓ | **YY**x |
| Clock | ✓✓ | ✓✓ | Xx |
| Cookpad | ✓✓ | ✓✓ | Yx |
| Dictionary | ✓✓✓ | ✓✓✓ | **YY**x |
| Fuelio | ✓✓✓ | ✓✓✓ | x✓✓ |
| Geek | ✓✓ | **YY** | **YY** |
| SchoolPlanner | ✓✓✓ | ✓✓✓ | xxx |
| SoundCloud | ✓✓ | ✓✓ | Yx |
| TodoList | ✓✓✓✓ | YY✓✓ | **YY**x✓ |
| TripIt | ✓✓✓ | ✓✓✓ | **Y**x✓ |
| Vimeo | ✓✓✓ | ✓✓✓ | xx✓ |
| Walmart | ✓✓ | ✓✓ | ✓✓ |
| ZipRecruiter | ✓✓✓ | ✓✓✓ | xx✓ |

'x' shows a failure was found in an app (row) while executing under a setting (column).
Bold 'Y' is a failure that was detected using Latte but not using Google Accessibility Scanner.
'✓' means the test or use case could be executed completely under a setting.
The first five highlighted apps have confirmed accessibility issues per prior user study.

A set of 2 to 4 test cases per app was constructed using Appium, which is an open-source testing framework. In total, 50 test cases for 20 apps were constructed. The test cases reflect a sample of the apps' main use cases, as provided in their descriptions (e.g., register an account, search for products, place products in a shopping cart). For the apps with confirmed issues (first 5 apps highlighted in Table 1 above) one of the test cases corresponds to the previously reported use case that users with disability could not perform. Our experiments were conducted on a MacBook Pro with 2.8 GHz Core i7 CPU and 16 GB memory (a typical computer setup for development) using an Android emulator (SDK 27).

RQ1. Accuracy of Latte

The 50 GUI test cases were first executed to ensure they are constructed correctly. The Use-Case Specifications from the tests were generated and executed using both SwitchAccess with two physical switches (Next and Select) and TalkBack with directional navigation (swiping).

Table 1 summarizes the presence of accessibility failures in different settings. In a cell, 'x' indicates a use case of an app (row header) that could not be executed using an assistive service (column header) due to an accessibility failure, and '✓' indicates a use case that could be fully executed without any failure. As shown under column heading "None", all original test cases passed, since they do not check the accessibility of apps, but rather evaluate the correctness of corresponding use cases. All accessibility results were manually examined and the failures were verified. Latte achieves 100% precision (no false positives) in determining accessibility failures in the use cases; in other words, all of the failed use cases in the experiments manifest a real accessibility issue. As can be seen, 11 use cases in 6 apps and 39 use cases in 19 apps have accessibility failures with SwitchAccess and TalkBack, respectively. Additionally, Latte detected 17 and 25 accessibility warnings using SwitchAccess and TalkBack, respectively. The warnings are not reported in Table 1, but discussed in more detail below.

The number of interactions for executing a use case with different assistive services was analyzed. On average, Latte utilized 11, 51, and 43 interactions to finish each use case under None, SwitchAccess, and TalkBack settings, respectively. Additionally, the ratios of the number of interactions utilized for SwitchAccess and TalkBack over those utilized for None were 5 and 4, respectively. This means Latte utilized more than 4 interactions using assistive services to fulfill a single interaction without such services, giving a glimpse into the practical challenges disabled users face in their usage of mobile apps.

RQ2. Latte Vs. Google Accessibility Scanner

Google Accessibility Scanner was run at each step of all use cases. Then, the failures detected by Latte was compared against the issues reported by Scanner. Bold 'Y' in Table 1 represents the corresponding use case has an accessibility failure detected by Latte that Scanner could not detect.

Scanner was able to detect only 18 of the 50 accessibility failures detected by Latte in the evaluated use cases. For each failure detected by LATTE, we examined all of the issues reported by Scanner. If any of those issues were found to be related to the actual fault, it was assumed that the Scanner can help to find the failure, e.g., Scanner can detect missing labels. Scanner could not detect any of the 11 accessibility failures detected by Latte using SwitchAccess, and 21 of the 39 failures detected by Latte using TalkBack. While Latte was able to detect all of the 5 issues confirmed by actual users with disability in the first 5 apps of Table 1, Scanner was only able to detect 1 of the issues (in Astro app). In addition, Scanner was not able to find the accessibility failures in 8 of our randomly selected subject apps.

Scanner reports an exorbitant number of issues that would overwhelm a typical developer. It reports on average 34 issues per use case for a total of 1,716 issues in the 50 use cases in the above experiments. Interestingly, out of the 1,716 reported issues by Scanner, only 18 were relevant to the serious accessibility failures reported by Latte. In comparison, Latte produces at most one accessibility failure per use case. For example, in FIG. 7D, Scanner detected a number of issues, e.g., "Get Smarter" has low text contrast. The Scanner did not report any problem regarding the top two buttons (menu and search icons) that cannot be reached using TalkBack and SwitchAccess, making the app totally inaccessible.

RQ3. Qualitative Study of Detected Accessibility Failures and Warnings

Figure 7A:
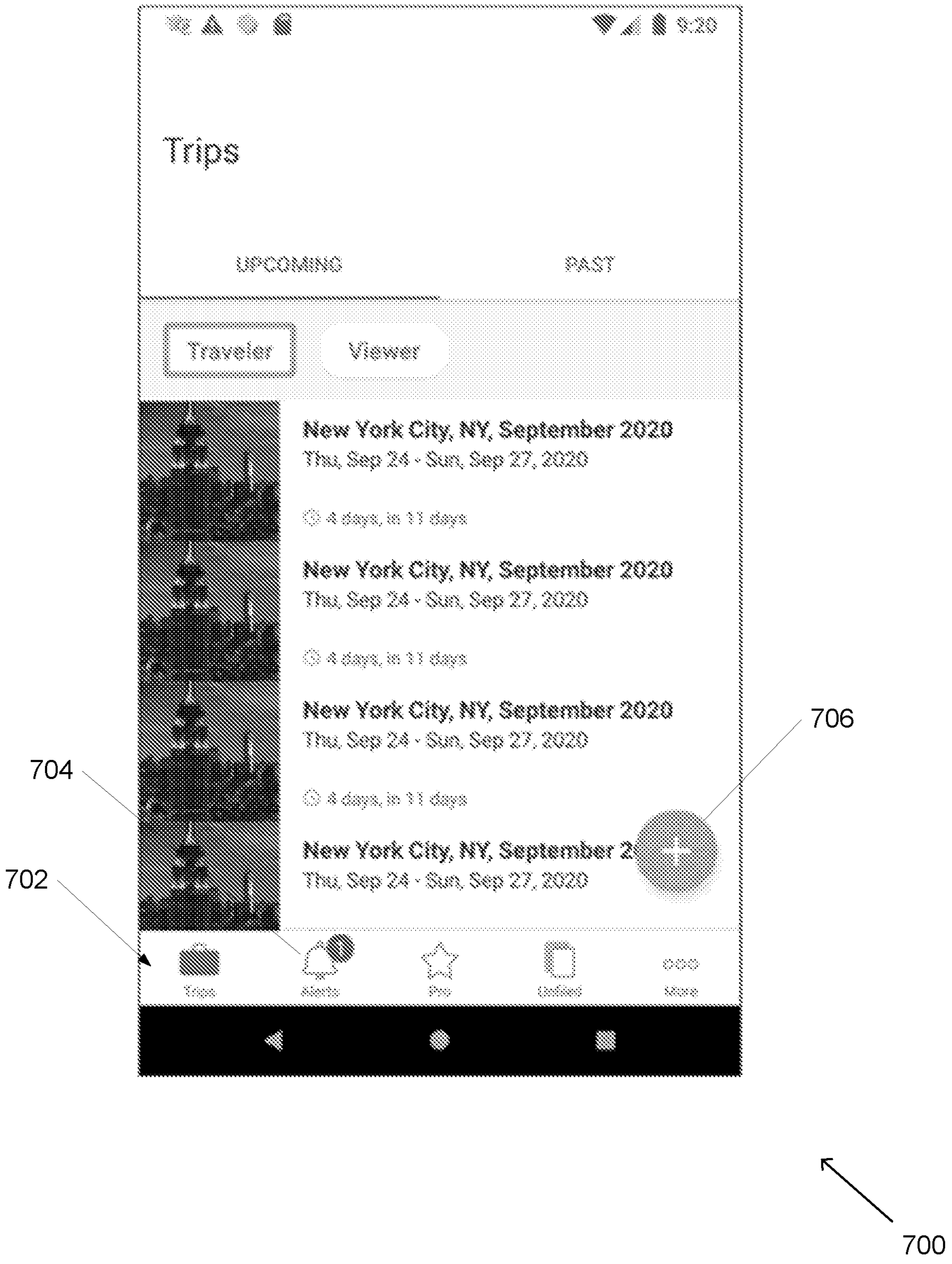
FIGS. 7A-D are screenshots of apps with accessibility failures in accordance with an embodiment of the invention.
Figure 7B:
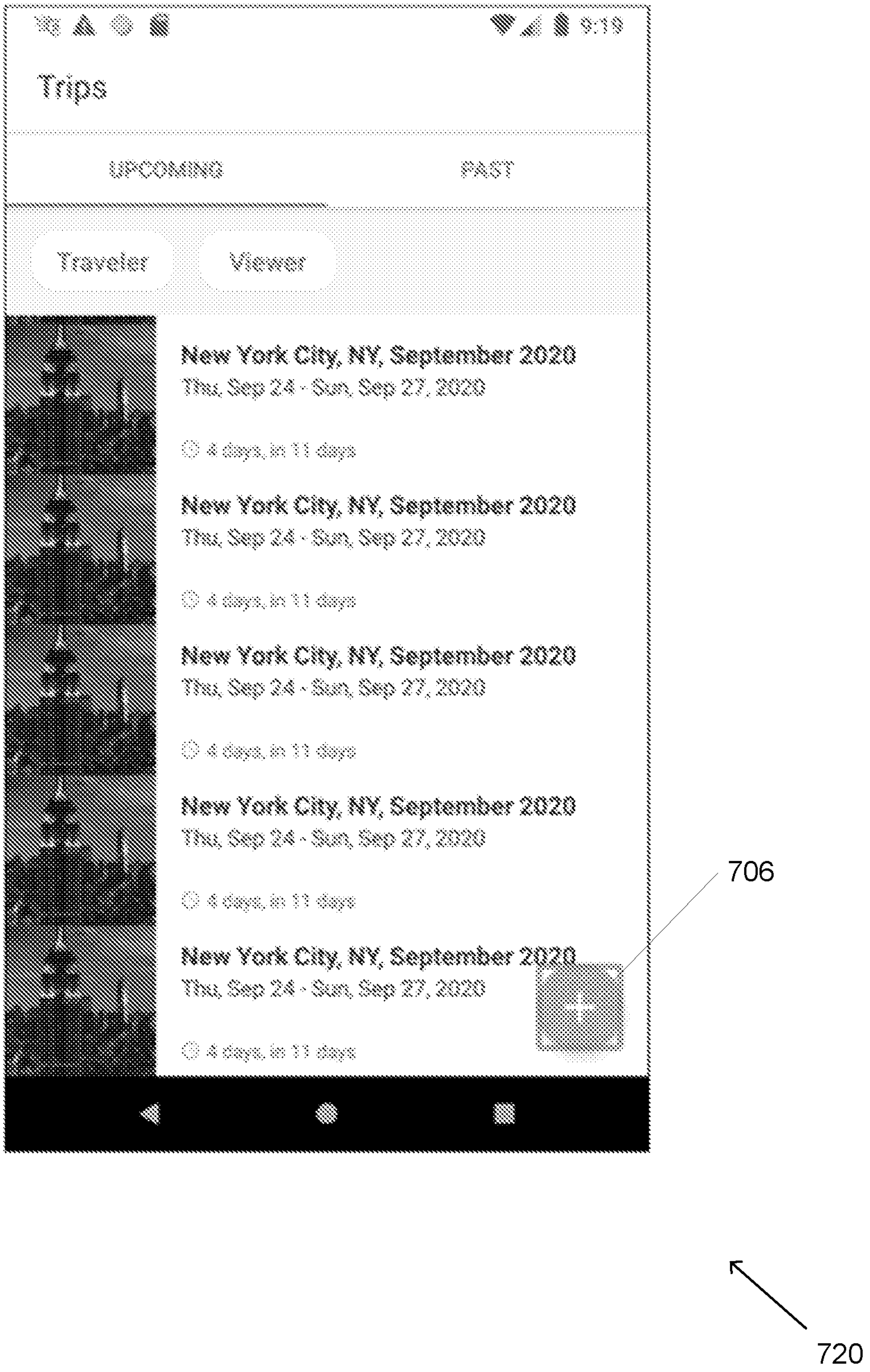
Figure 7C:
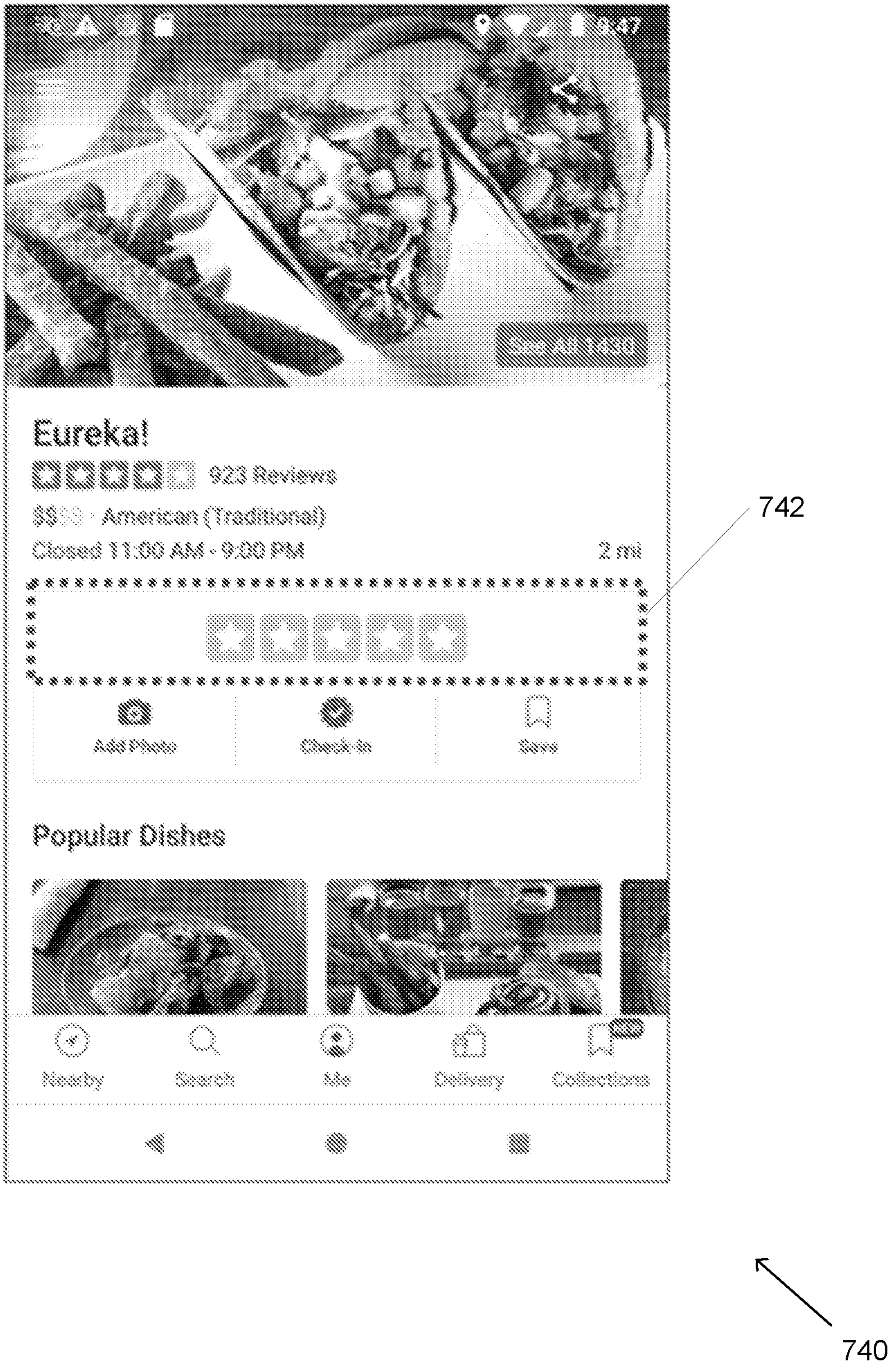
Figure 7D:
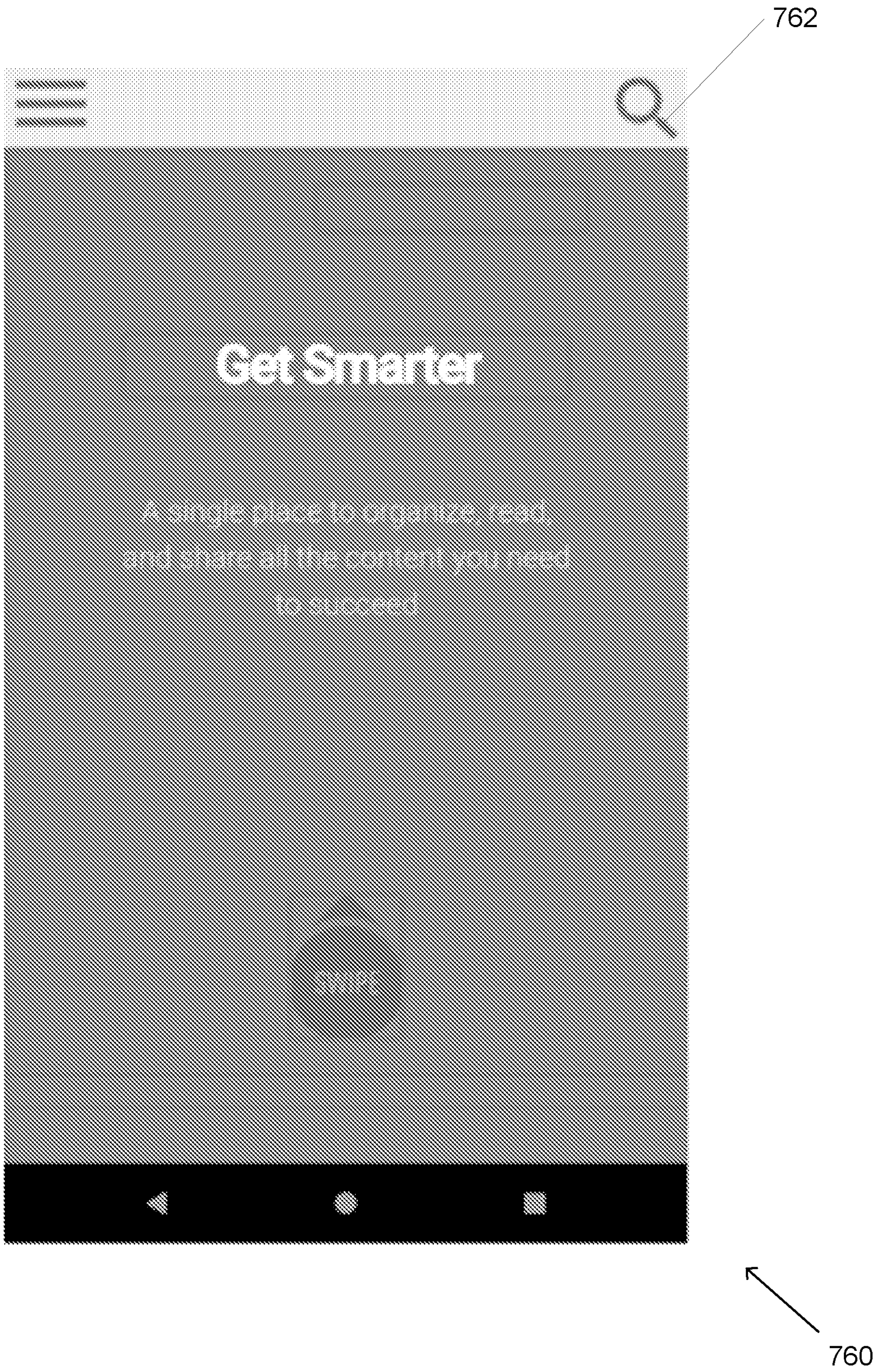
Figure 8A:
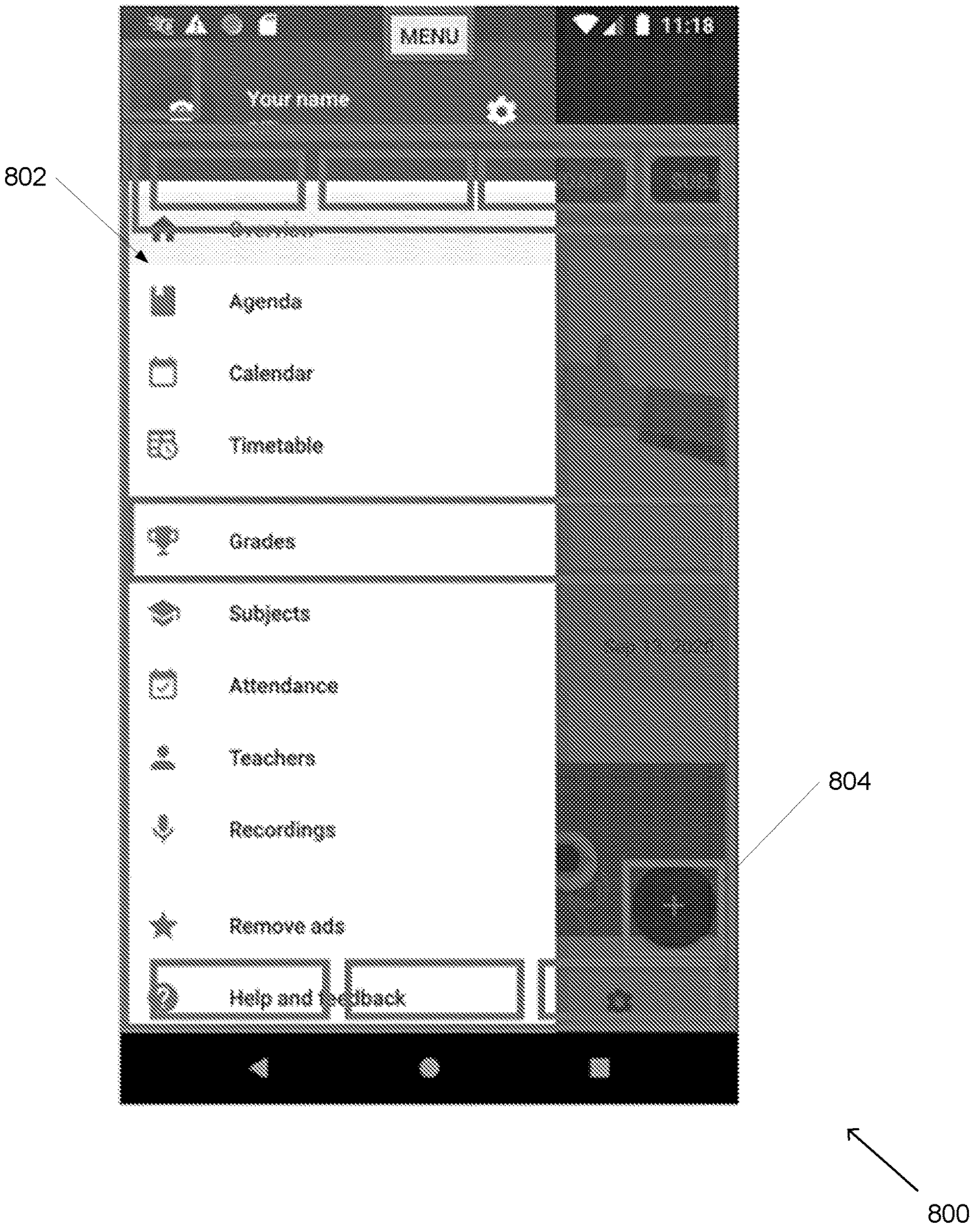
Figure 8B:
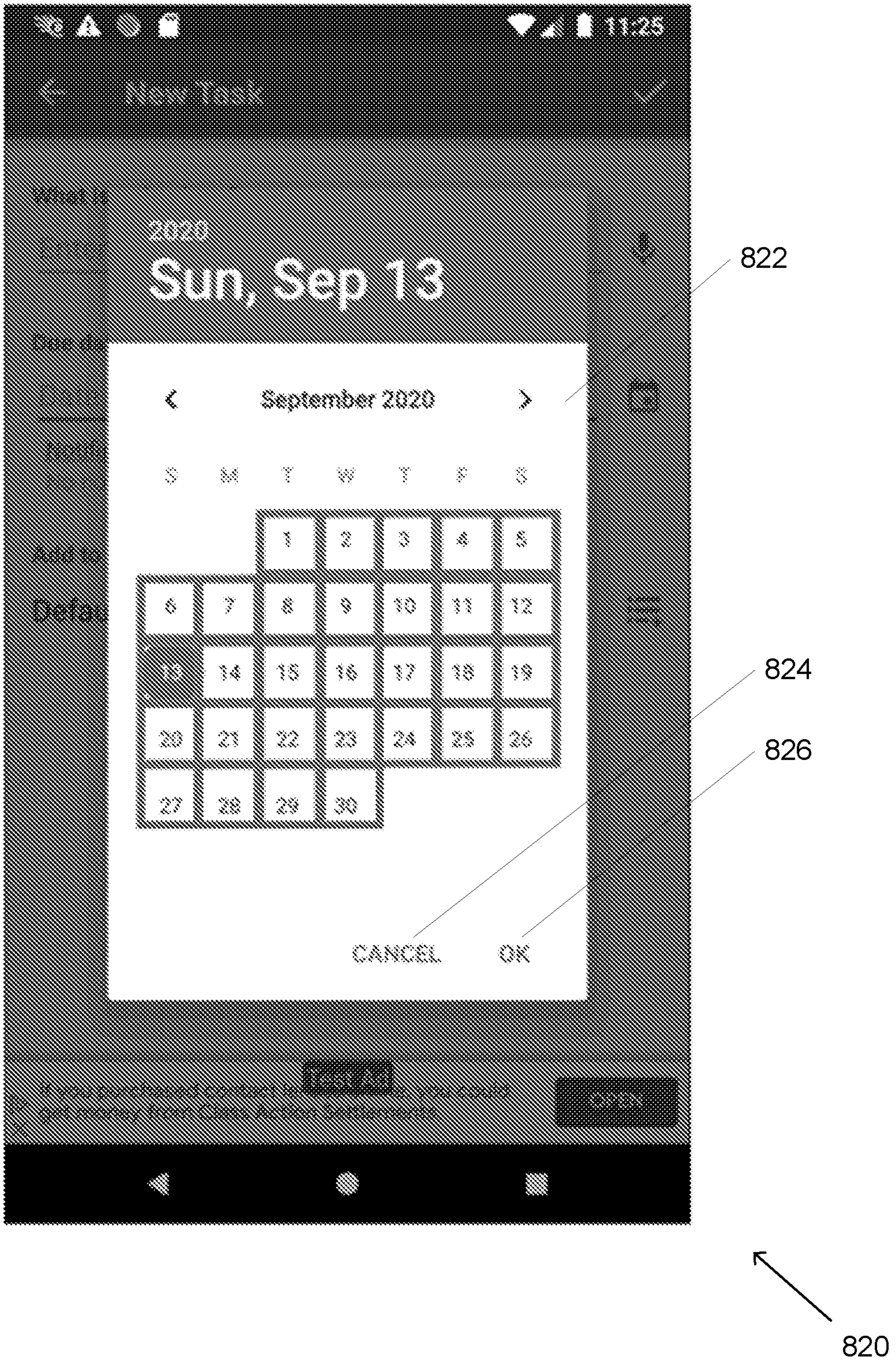

Screenshots of apps with accessibility failures in accordance with an embodiment of the invention are shown in FIGS. 7A-D. Screenshots of apps with accessibility issues in accordance with an embodiment of the invention are shown in FIGS. 8A-C.

Accessibility Failures. All use-case failures were examined and categorized into the following three groups:

Dynamic Layout. Some apps change the visibility of elements on the screen dynamically. For example, FIG. 7A shows the initial screen 700 of TripIt app. If a user wants to reach the bottom menu 702, e.g., clicking on the Alert icon 704, the user would need to explore the elements to locate the target widget; however, during the directional navigation with TalkBack, the bottom menu 702 disappears as illustrated by screen 720 in FIG. 7B. The reason behind hiding the menu is to improve the user experience by providing more space in the middle list (where a sighted user is looking for an item). However, this change in the layout makes the bottom menu 702 inaccessible for a blind user, since the user does not know the menu 702 has disappeared. The accessibility failures in TripIt and Dictionary apps belong to this category. This observation is consistent with the findings in a prior work that showed usability and accessibility concerns are not a subset of each other. Furthermore, this example suggests improving the usability of a use case for some users may in fact degrade the accessibility of that use case for others.

Navigation Loop. Assistive services may not reach a GUI element in some apps because of a static or dynamic loop in directional navigation. Developers can create a static loop by defining custom traversal order over elements using accessibilityTraversalAfter attribute. While Accessibility Scanner can detect static loops, none of the apps in this experiment had this issue. On the other hand, a dynamic loop is caused by inserting elements while the user interacts with an app. For example, as described above, the images in the background are inserted as the user navigates through them, making the navigation list virtually infinite. This issue is usually caused by RecyclerView widget where its adapter indefinitely inserts items into the container. The accessibility failures of this type could be found in Yelp, CalorieCounter, CookPad, Geek, and SoundCloud apps.

Non-Standard Implementation. Developers use customized GUI widgets in their apps that may have different behavior when users interact with them using an assistive service. For example, FIG. 7C is the page 740 of a restaurant in Yelp where users can rate the restaurant (the dotted box 742). However, TalkBack cannot focus on the rating widget 742 since it is a customized TextView without any text. Therefore, even a sighted user using TalkBack cannot select this widget 742 to rate the restaurant. Another source of these failures is using WebView widgets carelessly. WebView allows Android apps to load UI elements using web technologies, e.g., HTML, JavaScript. For example, in Feedly app 760 as illustrated in FIG. 7D, the search icon 762 at the top right is a WebView icon where its clickable attribute is false, meaning it cannot be invoked using assistive services. This attribute, however, does not prevent a user without disability from directly tapping the icon 762, which results in the corresponding JavaScript event handler to be invoked. Latte detected these types of failures in iPlayRadio, Feedly, Checkout51, Yelp, Budget, and TodoList apps.

Accessibility Warnings. The use cases with Accessibility Warnings was also studied and categorized them into four categories. Recall that Latte may report an accessibility warning when a step in the use-case execution takes more than a specific number of interactions (e.g., 15 interactions in the experiments herein).

Overlapping Layouts. Most of the apps have multiple layouts that overlay on top of each other, i.e., Activity, menu, and dialogue layout. A user who directly interacts with the screen only considers the elements on the top layout. However, TalkBack and SwitchAccess visit all focusable elements regardless of the layout hierarchy. Therefore, users who use assistive services often navigate through elements even if they are not on the top layout. For example, FIG. 8A shows the main screen 800 of the School Planner app. As can be seen, the side menu 802 is the active window (it is fully visible). However, it takes at least 12 interactions for a user to even reach the first item in the menu. Developers can fix this issue by making the elements in the non-top layouts unfocusable.

Far-Off Widget. All screen elements can be accessed virtually in no time for a user who directly interacts with the device. However, users relying on assistive services access the elements sequentially. Therefore, it takes longer for them to access a frequently used element located at the end of the navigation list. For example, in the TripIt app 700 as illustrated in FIG. 7A, a user has to navigate all elements from the top to the bottom to access the fab icon 706 (the icon 706 with a plus sign, highlighted in FIG. 7B). To resolve these issues, developers can define a custom navigation to reduce the interactions required to reach the important elements. For example, in the School Planner app 800 as illustrated in FIG. 8A, the fab icon 804 is located at the top of the navigation list, although its actual position on the screen is at the bottom right.

Grid Layout. Grids may provide an efficient layout for presenting multiple items in a small space, all of which can be accessed in no time for users without disability. However, since a grid's items are accessed linearly by SwitchAccess, it takes a lot of interactions to reach the last element on the gird. For example, in the TodoList app 820, the calendar widget 822 has 30 items in the grid that need to be visited before reaching to "CANCEL" or "OK" buttons 824, 826 as illustrated in FIG. 8B. To fix this, developers can provide different layouts for different settings, e.g., a text-based date picker when TalkBack or SwitchAccess are enabled.

Web View. There is a common practice for mobile developers to reuse web content (implemented in HTML/JavaScript) for some parts of their apps using WebView widget. However, assistive services cannot analyze web elements properly, as discussed above in the case of Non-Standard Implementation category of accessibility failures. Even if improper usage of web elements does not make an app inaccessible, it can degrade the user experience. For example, in the case of Dictionary app 840, shown in FIG. 8C, the definition of a term 842 is shown in terms of a series of web elements 844, and each word in the passage is a clickable Android GUI element. Consequently, TalkBack and SwitchAccess need to navigate through all of these elements to reach the end of the text.

Although specific experiments and evaluations of automated assistive-technology driven accessibility testing environments are discussed above with respect to FIGS. 7A-8C, any of a variety of experiments and evaluations for accessibility testing environments using assistive-technology as appropriate to the requirements of a specific application can be utilized in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. An automated environment for testing an application ("app under test") using at least one assistive service, the automated environment being embodied in code executable by a processor of a testing device, which when executed causes the testing device to:

generate at least one use-case specification for an app under test, wherein the at least one use-case specification comprises a human-perceivable step to be completed on the app under test;

execute the at least one use-case specification on the app under test using the at least one assistive service, wherein the at least one assistive service assists a user with a disability to complete a functionality on the app under test, and wherein the at least one use-case specification is executed by:

launching the app under test;

launching the at least one assistive service to operate in conjunction with the app under test; and performing the at least one use-case specification on the app under test, wherein the human-perceivable step of the at least one use-case specification is performed using the at least one assistive service; and generate an accessibility report for the app under test.

2. The automated environment of claim 1, wherein the at least one assistive service is a screen reader for users with visual impairment.

3. The automated environment of claim 1, wherein the at least one assistive service is a navigation tool for users with motor impairment.

4. The automated environment of claim 1, wherein the at least one assistive service is a voice user interface for users with visual, physical, or motor impairment.

5. The automated environment of claim 1, wherein the at least one assistive service is an alerting tool for users with hearing impairment.

6. The automated environment of claim 1, wherein the automated environment is embodied in further code that, when executed by the processor, further causes the testing device to generate the at least one use-case specification by analyzing at least one Graphical User Interface (GUI) test.

7. The automated environment of claim 6, wherein the automated environment is embodied in further code that, when executed by the processor, further causes the testing device to analyze the GUI test by determining at least one GUI element and at least one action performed on the at least one GUI element.

8. The automated environment of claim 1, wherein the automated environment is embodied in further code that, when executed by the processor, further causes the testing device to generate the at least one use-case specification by observing for a manually performed human-perceivable step on the app under test.

9. The automated environment of claim 1, wherein the automated environment is embodied in further code that, when executed by the processor, further causes the testing device to generate the at least one use-case specification by automatically crawling the app under test.

10. The automated environment of claim 1, wherein the automated environment is embodied in further code that, when executed by the processor, further causes the testing device to execute the at least one use-case specification by generating accessibility events.

11. The automated environment of claim 10, wherein the automated environment is embodied in further code that, when executed by the processor, further causes the testing device to execute the at least one use-case specification by analyzing the accessibility events and initiating at least one action using the assistive service.

12. The automated environment of claim 11, wherein the automated environment is embodied in further code that, when executed by the processor, further causes the testing device to execute the at least one use-case specification by executing the at least one action on the app under test.

13. The automated environment of claim 12, wherein the automated environment is embodied in further code that, when executed by the processor, further causes the testing device to execute the at least one use-case specification by receiving result data from the app under test based on executing the at least one action.

14. The automated environment of claim 13, wherein the automated environment is embodied in further code that, when executed by the processor, further causes the testing device to generate the accessibility report using the result data from the app under test.

15. The automated environment of claim 1, wherein the automated environment is embodied in further code that, when executed by the processor, further causes the testing device to execute the at least one use-case specification using at least one termination condition.

16. The automated environment of claim 15, wherein the at least one termination condition is configurable.

17. The automated environment of claim 1, wherein the automated environment is embodied in further code that, when executed by the processor, further causes the testing device to execute the at least one use-case specification on the app under test via an emulator.

18. The automated environment of claim 1, wherein the accessibility report comprises accessibility failures encountered by the app under test during execution of the at least one use-case specification using the at least one assistive service.

19. The automated environment of claim 1, wherein the accessibility report comprises recorded screens of the app under test during execution of the at least one use-case specification using the at least one assistive service.

20. The automated environment of claim 1, wherein the accessibility report comprises execution details that include metadata generated during execution of the at least one use-case specification using the at least one assistive service.

21. The automated environment of claim 1, wherein the accessibility report comprises accessibility warnings encountered by the app under test during execution of the at least one use-case specification using the at least one assistive service.

22. The automated environment of claim 1, wherein the automated environment is executed after an app update as part of a continuous integration development process.

23. The automated environment of claim 1, wherein the automated environment is executed as part of a regression testing process to determine if the accessibility of a new version of the app under test is improving or degrading.

* * * * *